United States Patent
Kim et al.

(10) Patent No.: US 10,750,401 B2
(45) Date of Patent: Aug. 18, 2020

(54) METHOD FOR TRANSMITTING OR RECEIVING FRAME IN WIRELESS LAN SYSTEM, AND DEVICE THEREFOR

(71) Applicant: LG ELECTRONICS INC., Seoul (KR)

(72) Inventors: Jeongki Kim, Seoul (KR); Kiseon Ryu, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/338,983

(22) PCT Filed: Sep. 29, 2017

(86) PCT No.: PCT/KR2017/011047
§ 371 (c)(1),
(2) Date: Apr. 2, 2019

(87) PCT Pub. No.: WO2018/066955
PCT Pub. Date: Apr. 12, 2018

(65) Prior Publication Data
US 2019/0246312 A1 Aug. 8, 2019

Related U.S. Application Data

(60) Provisional application No. 62/410,848, filed on Oct. 21, 2016, provisional application No. 62/409,383, (Continued)

(51) Int. Cl.
*H04W 28/02* (2009.01)
*H04W 84/12* (2009.01)
(Continued)

(52) U.S. Cl.
CPC ....... *H04W 28/0278* (2013.01); *H04W 28/02* (2013.01); *H04W 28/06* (2013.01);
(Continued)

(58) Field of Classification Search
CPC . H04W 28/06; H04W 28/0278; H04W 28/02; H04W 84/12; H04W 72/1284;
(Continued)

(56) References Cited

U.S. PATENT DOCUMENTS 9,826,532 B1 * 11/2017 Chu .................. H04W 72/1284
2016/0366254 A1 * 12/2016 Asterjadhi ............ H04L 69/324
(Continued)

FOREIGN PATENT DOCUMENTS

| WO | 2011159102 | 12/2011 |
| WO | 2016053024 | 4/2016 |
| WO | 2016060448 | 4/2016 |

OTHER PUBLICATIONS

PCT International Application No. PCT/KR2017/011047, International Search Report dated Jan. 10, 2018, 6 pages.
(Continued)

*Primary Examiner* — Redentor Pasia
(74) *Attorney, Agent, or Firm* — Lee, Hong, Degerman, Kang & Waimey PC

(57) ABSTRACT

A method by which a station (STA) transmits a frame including a buffer state report (BSR) in a wireless LAN (WLAN) system, according to one embodiment of the present invention, comprises the steps of: configuring the BSR of the STA to a first control sub-field among one or more control sub-fields aggregated in an aggregated-control (A-control) field; and transmitting the A-control field through a high throughput (HT) control filed included in a MAC header of the frame, wherein the first control sub-field for the BSR is configured as a short BSR when a second
(Continued)

control sub-field in the A-control field includes uplink power headroom information of the STA.

15 Claims, 30 Drawing Sheets

Related U.S. Application Data filed on Oct. 18, 2016, provisional application No. 62/406,916, filed on Oct. 11, 2016, provisional application No. 62/403,720, filed on Oct. 4, 2016.

(51) Int. Cl.
*H04W 52/36* (2009.01)
*H04W 28/06* (2009.01)
*H04W 72/12* (2009.01)

(52) U.S. Cl.
CPC ......... *H04W 52/36* (2013.01); *H04W 52/365* (2013.01); *H04W 72/1252* (2013.01); *H04W 84/12* (2013.01)

(58) Field of Classification Search
CPC  H04W 72/1252; H04W 52/36; H04W 52/365
See application file for complete search history.

(56) References Cited

U.S. PATENT DOCUMENTS

| | | | |
|---|---|---|---|
| 2017/0078967 A1* | 3/2017 | Asterjadhi | H04W 52/0229 |
| 2017/0202023 A1* | 7/2017 | Zhou | H04W 72/12 |
| 2017/0230860 A1* | 8/2017 | Li | H04W 28/0278 |
| 2018/0302930 A1* | 10/2018 | Wang | H04W 48/16 |
| 2019/0280831 A1* | 9/2019 | Chu | H04L 5/005 |

OTHER PUBLICATIONS

Park, J. et al., "Buffer Status Report in HE Control field", doc.: IEEE 802.11-16/0628r1, May 2016, 23 pages.
Asterjadhi, A. et al., "HE A-Control field", doc.: IEEE 802.11-15/1121r0, Sep. 2015, 18 pages.

* cited by examiner

FIG. 5
(a) 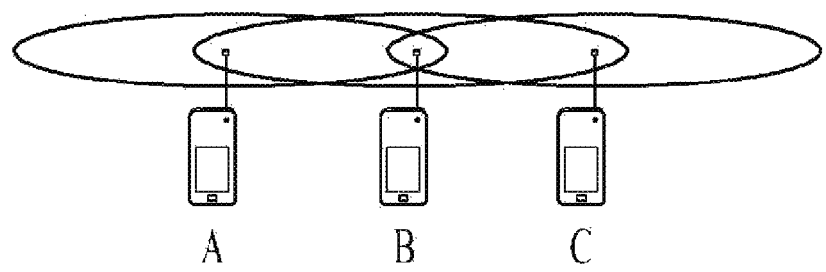
(b) 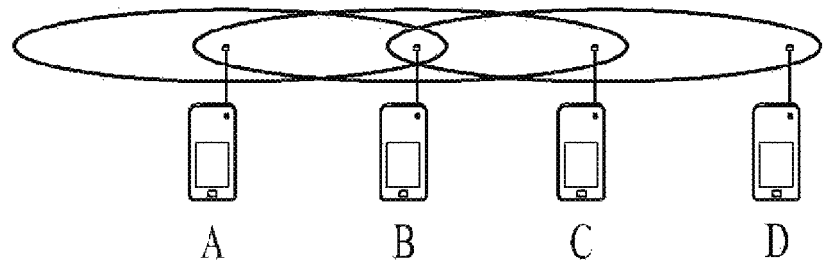

FIG. 6
(a) 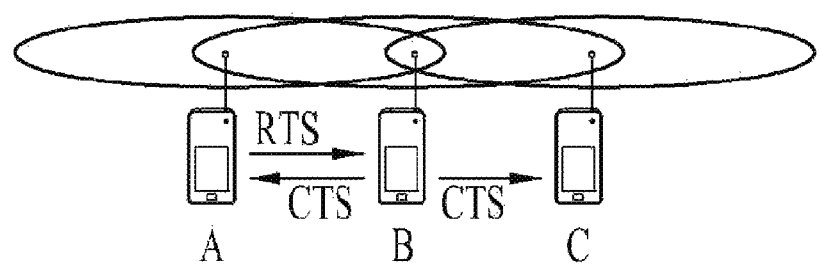
(b) 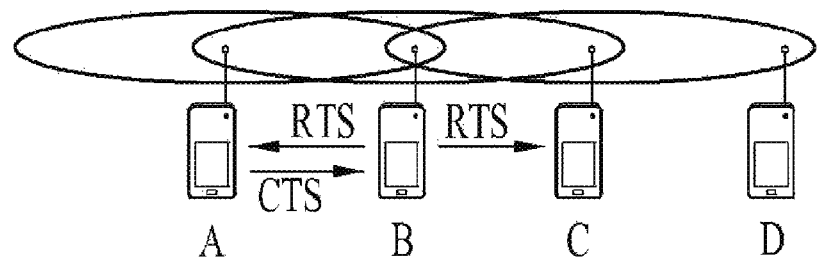

FIG. 11

| B1 | B2 | B3 B5 | B6 B8 | B9 B23 | B24 B26 | B27 | B28 | B29 |
|---|---|---|---|---|---|---|---|---|
| ~~Reserved~~ | MRQ | MSI/ STBC | MFSI/ GID-L | MRQ | GID-H | Coding Type | FB Tx Type | Unsolicited MFB |
| Bits: + | 1 | 3 | 3 | 15 | 3 | 1 | 1 | 1 |

FIG. 13

| B0 | B4 | B5 | B12 | B13 | B17 | B18 | B22 | B23 | B24 | B25 |
|---|---|---|---|---|---|---|---|---|---|---|
| HE TB PPDU Length | | RU Allocation | | DL Tx Power | | UL Target RSSI | | UL MCS | | Reserved |

Bits: 5, 8, 5, 5, 2, 1

FIG. 14

| B0 | B2 | B3 | B4 | B5 | B6 | B8 | B9 | B11 |
|---|---|---|---|---|---|---|---|---|
| Rx NSS | | Channel Width | | UL MU Disable | Tx NSTS | | Reserved | |
| Bits: 3 | | 2 | | 1 | 3 | | 3 | |

FIG. 15

| B0 | B2 | B3 | B6 | B7 | B8 | B15 |
|---|---|---|---|---|---|---|
| NSS | | HE-MCS | | DCM | Reserved | |

Bits: 3      4      1      8

FIG. 16

| B0 | B3 | B4 | B5 | B6 | B7 | B8 | B9 | B10 | B17 | B18 | B25 |
|---|---|---|---|---|---|---|---|---|---|---|---|
| ACI Bitmap | | Delta TID | | ACI High | | Scaling Factor | | Queue Size High | | Queue Size All | |

Bits:     4          2          2          2          8          8

FIG. 21

| B0 | | B5 | B6 | B7 |
|---|---|---|---|---|
| UL Power Headroom | | | QoS Null frame for BSR | Reserved |

Bits:    6              1           1

FIG. 23

| B0 | B3 | B4 | B5 | B6 | B7 | B8 | B15 |
|---|---|---|---|---|---|---|---|
| ACI Bitmap | | Delta TID | | Scaling Factor | | Queue Size All | |

Bits: 4, 2, 2, 8

FIG. 24

| B0 | B3 | B4 | B5 | B6 | B7 | B8 | B13 |
|---|---|---|---|---|---|---|---|
| ACI Bitmap | | Delta TID | | Scaling Factor | | Queue Size All | |

Bits: 4     2     2     6

FIG. 25

| B0 | B3 | B4 | B5 | B6 | B7 | B8 | B14 |
|---|---|---|---|---|---|---|---|
| ACI Bitmap | | Delta TID | | Scaling Factor | | Queue Size All | |

Bits:    4          2          2          7

FIG. 26

| B0 | B3 | B4 | B5 | B6 | B7 | B14 |
|---|---|---|---|---|---|---|
| ACI Bitmap | | Delta TID | | Scaling Factor | Queue Size All | |

Bits:  4    2    1    8

METHOD FOR TRANSMITTING OR RECEIVING FRAME IN WIRELESS LAN SYSTEM, AND DEVICE THEREFOR

CROSS-REFERENCE TO RELATED APPLICATIONS

This application is the National Stage filing under 35 U.S.C. 371 of International Application No. PCT/KR2017/011047, filed on Sep. 29, 2017, which claims the benefit of U.S. Provisional Application No. 62/403,720, filed on Oct. 4, 2016, 62/406,916, filed on Oct. 11, 2016, 62/409,383, filed on Oct. 18, 2016, and 62/410,848, filed on Oct. 21, 2016, the contents of which are all hereby incorporated by reference herein in their entirety.

BACKGROUND OF THE INVENTION

Field of the Invention

The present invention relates to a method for transmitting and receiving a frame in a wireless LAN system and, more particularly, to a method and a device for transmitting or receiving a frame including a buffer status report (BSR).

Related Art

Standards for wireless LAN (WLAN) technology are being developed as Institute of Electrical and Electronics Engineers (IEEE) 802.11. IEEE 802.11a and IEEE 802.11b employ an unlicensed band of 2.4. GHz or 5 GHz, wherein IEEE 802.11b provides a transmission speed of 11 Mbps, and IEEE 802.11a provides a transmission speed of 54 Mbps. IEEE 802.11g employs orthogonal frequency-division multiplexing (OFDM) at 2.4 GHz and provides a transmission speed of 54 Mbps. IEEE 802.11n employs multiple-input multiple-output OFDM and provides a transmission speed of 300 Mbps for four spatial streams. IEEE 802.11n supports a channel bandwidth of up to 40 MHz and provides a transmission speed of 600 Mbps.

The WLAN standards have evolved into IEEE 802.11ax via IEEE 802.11ax, which employs a bandwidth of up to 160 MHz, supports eight spatial streams, and supports a speed of up to 1 Gbit/s, and the standardization of IEEE 802.11ax is under discussion.

SUMMARY OF THE INVENTION

An aspect of the present invention is to provide a method and a device for transmitting or receiving a buffer status report and uplink power headroom information together through one frame.

The present invention is not limited to the aforementioned aspect, and other aspects may be derived from embodiments of the present invention.

In accordance with one aspect of the present invention, there may be provided a method in which a station (STA) transmits a frame including a buffer status report (BSR) in a wireless local area network (WLAN) system, the method including: configuring a BSR of the STA in a first control subfield among one or two or more control subfields aggregated in an aggregated (A)-control field; and transmitting the A-control field through a high throughput (HT) control field included in an MAC header of a frame, wherein the first control subfield for the BSR may include at least one of first information indicating an access category of traffic buffered in the STA, second information indicating the size of the buffered traffic, third information indicating a unit of the second information, fourth information indicating the number of traffic identifiers (TIDs), fifth information indicating an access category of particular traffic of the buffered traffic, and sixth information indicating the size of the particular traffic, and when a second control subfield of the A-control field includes uplink power headroom information about the STA, the first control subfield for the BSR may be configured as a short BSR in which the fifth information and the sixth information are omitted.

In accordance with another aspect of the present invention, there may be provided a STA transmitting a frame including a BSR in a WLAN system, the STA including: a processor to configure a BSR of the STA in a first control subfield among one or two or more control subfields aggregated in an A-control field; and a transmitter to transmit the A-control field through an HT control field included in an MAC header of a frame under control of the processor, wherein the first control subfield for the BSR may include at least one of first information indicating an access category of traffic buffered in the STA, second information indicating the size of the buffered traffic, third information indicating a unit of the second information, fourth information indicating the number of TIDs, fifth information indicating an access category of particular traffic of the buffered traffic, and sixth information indicating the size of the particular traffic, and when a second control subfield of the A-control field includes uplink power headroom information about the STA, the first control subfield for the BSR may be configured as a short BSR in which the fifth information and the sixth information are omitted.

In accordance with still another aspect of the present invention, there may be provided a method in which an access point (AP) receives a frame including a BSR in a WLAN system, the method including: receiving an A-control field through an HT control field included in an MAC header of a frame; and obtaining a BSR of a STA via a first control subfield among one or two or more control subfields aggregated in an A-control field, wherein the first control subfield for the BSR may include at least one of first information indicating an access category of traffic buffered in the STA, second information indicating the size of the buffered traffic, third information indicating a unit of the second information, fourth information indicating the number of TIDs, fifth information indicating an access category of particular traffic of the buffered traffic, and sixth information indicating the size of the particular traffic, and when a second control subfield of the A-control field includes uplink power headroom information about the STA, the first control subfield for the BSR may be configured as a short BSR in which the fifth information and the sixth information are omitted.

In accordance with yet another aspect of the present invention, there may be provided an AP device performing the foregoing frame reception method.

When the frame is a Quality of Service (QoS) null frame, the fifth information and the sixth information omitted from the short BSR may be transmitted through a QoS control field included in the MAC header.

When the first control subfield for the BSR is configured as the short BSR, the third information indicating the unit of the second information may be reduced from two bits to one bit. For example, when the first control subfield for the BSR is configured as the short BSR, only two of four units available when the third information is two bits, which are 16 bytes, 128 bytes, 2048 bytes, and 16384 bytes, may be available.

The second information set to a first value may indicate that the size of the buffered traffic exceeds a threshold value, the second information set to a second value may indicate that the size of the buffered traffic is unknown, and the first value and the second value may change depending on whether the first control subfield for the BSR is configured as the short BSR.

Each of the one or two or more control subfields may include a control ID, a control ID of the first control subfield may be set to when the first control subfield for the BSR is not the short BSR, and the control ID of the first control subfield may be set to one of 5 to 15 when the first control subfield for the BSR is the short BSR.

The WLAN system may correspond to IEEE 802.11ax supporting a high-efficiency physical layer protocol data unit (HE PPDU), the HT control field of the MAC header may correspond to an HE Variant A-control, the first information may be an Access Category Index (ACI) Bitmap subfield, the second information may be a Queue Size All subfield, the third information may be a Scaling Factor subfield, the fourth information may be a Delta TID subfield, the fifth information may be an ACI High subfield, and the sixth information may be a Queue Size High subfield.

According to one embodiment, when a STA transmits an A-control filed including a BSR through an HT control field of an MAC header, if the A-control field further includes uplink power headroom, using a newly defined short BSR enables the STA to transmit the BSR and the uplink power headroom together through one frame without restriction on the size of the A-control field.

Effects other than the aforementioned effects may be derived from embodiments of the present invention.

BRIEF DESCRIPTION OF THE DRAWINGS

FIG. 5 illustrates a hidden node and an exposed node.

FIG. 6 illustrates an RTS and a CTS.

FIG. 11 illustrates a VHT Control Middle subfield of a VHT variant in a WLAN system supporting 11ax.

FIG. 13 illustrates control information for uplink multi-user response scheduling.

FIG. 14 illustrates control information for indicating an operating mode.

FIG. 15 illustrates control information for HE link adaptation.

FIG. 16 illustrates control information for a buffer status report.

FIG. 21 illustrates an example of newly defining a QoS Null Frame Indication field in an HE Variant HT Control field including UL power headroom according to an embodiment of the present invention.

FIG. 23 illustrates short BSR information according to an embodiment of the present invention.

FIG. 24 illustrates short BSR information according to another embodiment of the present invention.

FIG. 25 illustrates short BSR information according to still another embodiment of the present invention.

FIG. 26 illustrates short BSR information according to yet another embodiment of the present invention.

DESCRIPTION OF EXEMPLARY EMBODIMENTS

Hereinafter, the preferred embodiment of the present invention will be described in detail with reference to the appended drawings. The detailed description that will hereinafter be disclosed along with the appended drawings will only be provided to describe an exemplary embodiment of the present invention. And, therefore, it should be understood that the exemplary embodiment presented herein will not represent the only embodiment for carrying out the present invention.

The following detailed description includes specific details for providing a full understanding of the present invention. However, it will be apparent to anyone skilled in the art that the present invention can be carried out without referring to the above-mentioned specific details. In some cases, in order to avoid any ambiguity in the concept of the present invention, the disclosed structure and device may be omitted, or the disclosed structure and device may be illustrated as a block diagram based on their core functions.

As described above, the following description relates to a method and an apparatus for efficiently utilizing a channel having a wide band in a wireless LAN (WLAN) system. To this end, a WLAN system to which the present invention is applied will be described in detail.

Figure 1:
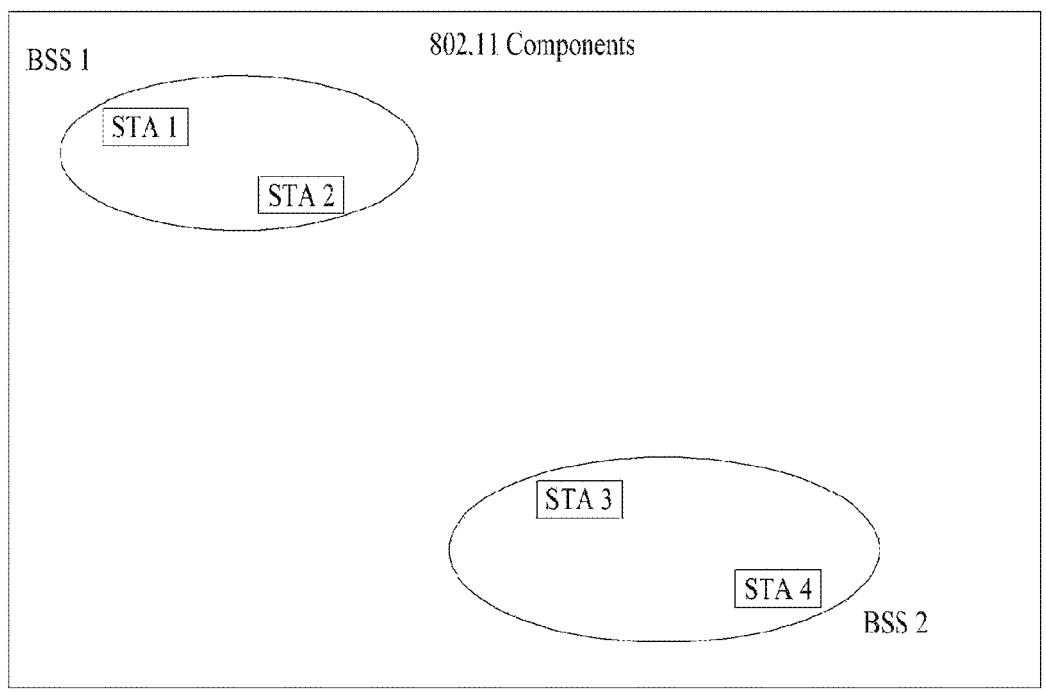
FIG. 1 is a diagram showing an exemplary configuration of a wireless LAN (WLAN) system.

FIG. 1 is a diagram showing an exemplary configuration of a wireless LAN (WLAN) system.

As shown in FIG. 1, a wireless LAN (WLAN) includes one or more Basic Service Set (BSS). A BSS is a set (or group) of stations (STAs) that successfully achieve synchronization so as to communication with one another.

As a logical entity including a Medium Access Control (MAC) and a Physical Layer interface for a wireless medium, an STA includes an access point (AP) and a non-AP Station. Among the STAs, a portable device (or terminal) that is operated by a user corresponds to a non-AP Station. And, therefore, when an entity is simply mentioned to as an STA, the STA may also refer to a non-AP Station. Herein, the non-AP Station may also be referred to as other terms, such as a terminal, a wireless transmit/receive unit (WTRU), a user equipment (UE), a mobile station (MS), a mobile terminal, a mobile subscriber unit, and so on.

Additionally, the AP is an entity providing its associated station (STA) with an access to a distribution system (DS) through a wireless medium. Herein, the AP may also be referred to as a centralized controller, a base station (B), a Node-B, a base transceiver system (BTS), a personal basic service set central point/access point (PCP/AP), a site controller, and so on.

A BSS may be categorized as an infrastructure BSS and an independent BSS (IBSS).

The BSS shown in FIG. 1 corresponds to an IBSS. The IBSS refers to a BSS that does not include an AP. And, since the BSS does not include an AP, access to the DS is not authorized (or approved), and, therefore, the IBSS functions as a self-contained network.

Figure 2:
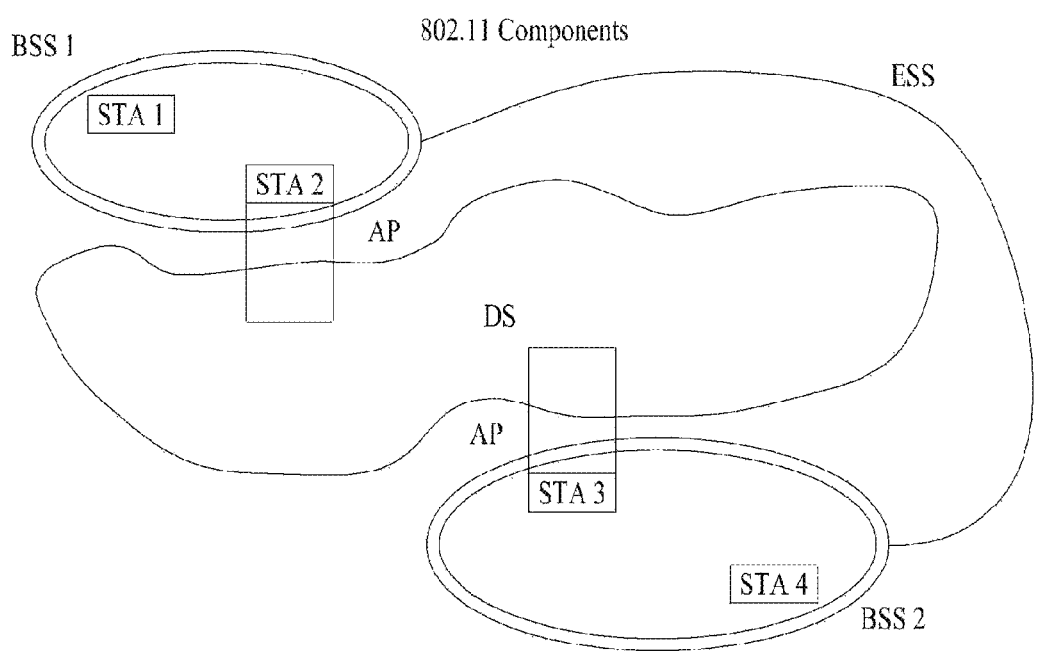
FIG. 2 is a diagram showing another exemplary configuration of a wireless LAN (WLAN) system.

FIG. 2 is a diagram showing another exemplary configuration of a wireless LAN (WLAN) system.

The BSS shown in FIG. 2 corresponds to an infrastructure BSS. The infrastructure BSS includes one or more STAs and APs. As a rule, although the communication between non-AP STAs is established by passing through the AP, in case a direct link is configured between the non-AP STAs, direct communication may also be established between the non-AP STAs.

As shown in FIG. 2, a plurality of infrastructure BSSs may be interconnected to one another through the DS. The plurality of BSSs being interconnected to one another through the DS is collectively referred to as an extended service set (ESS). The STAs being included in the ESS may perform communication between one another, and, a non-AP STA may shift (or relocate) from one BSS to another BSS within the same ESS while performing uninterrupted communication.

As a mechanism that connects the plurality of APs, the DS is not necessarily required to correspond to a network. As long as the DS is capable of providing a predetermined distribution service, there is no limitation in the structure or configuration of the DS. For example, the DS may correspond to a wireless network, such as a mesh network, or the DS may correspond to a physical structure (or entity) that connects the APs to one another.

Layer Structure

The operation of a STA operating in a WLAN system may be described regarding a layer structure. The layer structure may be configured by a processor in terms of a device configuration. A STA may have a plurality of layer structures. For example, the 802.11 standards mainly deal with an MAC sublayer on a data link layer (DDL) and a physical (PHY) layer. The PHY may include a physical layer convergence procedure (PLCP) entity and a physical medium dependent (PMD) layer. The MAC sublayer and the PHY layer conceptually include management entities respectively called an MAC sublayer management entity (MLME) and a physical layer management entity (PLME). These entities provide a layer management service interface in which a layer management function works.

To provide an accurate MAC operation, a station management entity (SME) is present in each STA. The SME is a layer-independent entity that is present in a separate management plane or can be seen to be off to the side. Although accurate functions of the SME are not illustrated in detail in this document, the SME may generally function to collect a layer-dependent state from various layer management entities (LMEs) and to similarly set the values of layer-specific parameters. Generally, the SME may perform these functions on behalf of a general system management entity and may implement a standard management protocol.

The foregoing entities interact in various manners. For example, the entities may interact by exchanging GET/SET primitives. A primitive refers to an element or a set of parameters related to a particular purpose. An XX-GET.request primitive is used to request the value of a given MIB attribute (management information-based attribute information). An XX-GET.confirm primitive is used to return an appropriate MIB attribute information value when a Status field indicates "success", and to return an error indication in a Status field otherwise. An XX-SET.request primitive is used to request an indicated MIB attribute to be set to a given value. When the MIB attribute indicates a particular operation, the XX-SET.request primitive is to request the operation to be performed. An XX-SET.confirm primitive is used to identify that an indicated MIB attribute is set to a requested value when the Status field indicates "success", and to return an error condition in the Status field otherwise. When the MIB attribute indicates a particular operation, the XX-SET.confirm primitive is to identify that the operation is performed.

The MLME and the SME may exchange various MIME_GET/SET primitives through an MLME_service access point (SAP). Further, various PLME_GET/SET primitives may be exchanged between the PLME and the SME through a PLME_SAP and may be exchanged between the MLME and the PLME through an MLME-PLME_SAP.

Link Setup Process

Figure 3:
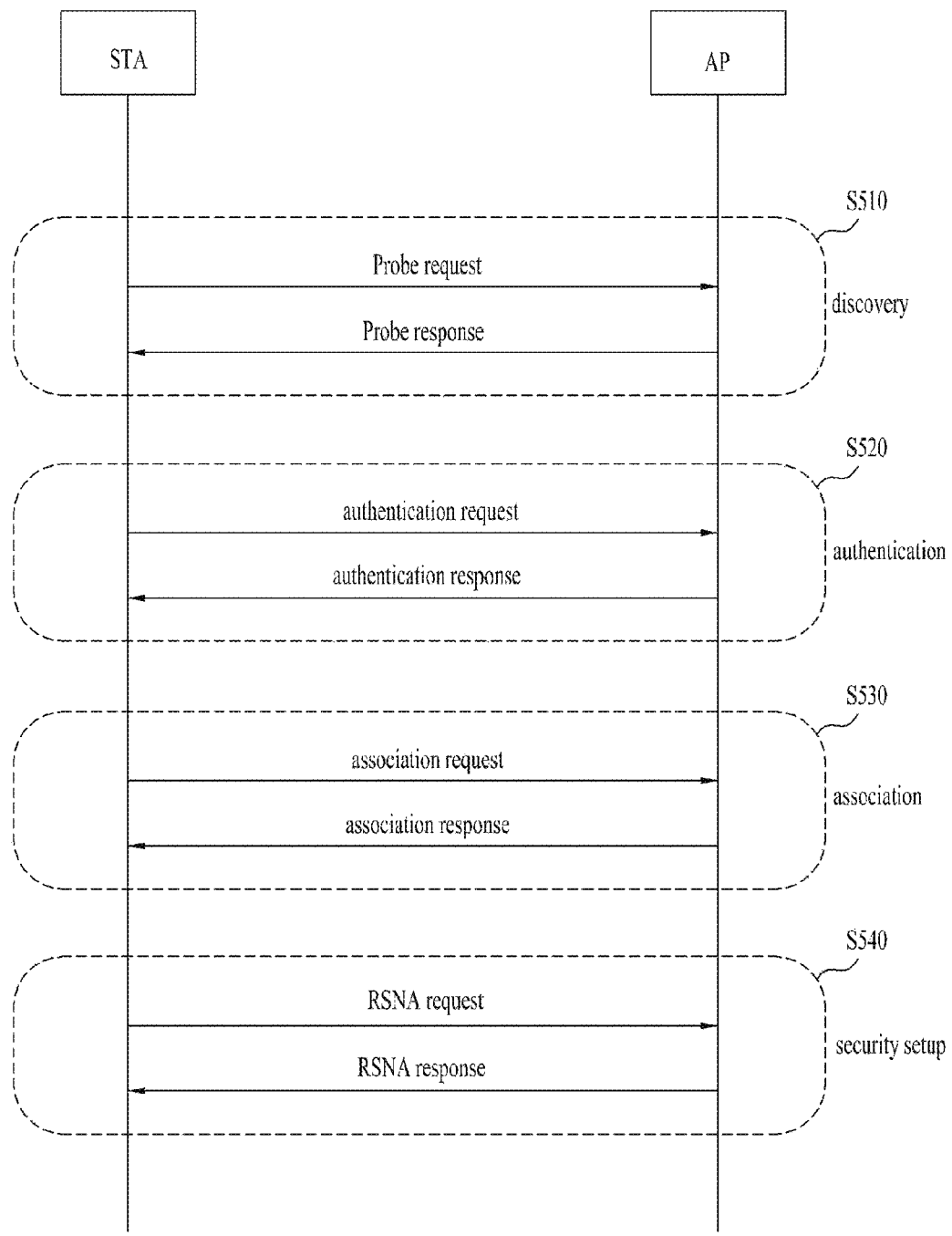
FIG. 3 illustrates a general link setup process.

FIG. 3 illustrates a general link setup process.

To set up a link to a network and to transmit and receive data, a STA first needs to discover a network, to perform authentication, to establish association, and to perform an authentication procedure for security. The link setup process may also be referred to as a session initiation process or a session setup process. Discovery, authentication, association, and security setup processes of the link setup process may be collectively referred to as an association process.

An illustrative link setup process is described with reference to FIG. 3.

In step S510, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning.

Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning waits for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

Comparing active scanning with passive scanning, active scanning involves a shorter delay and less power consumption than passive scanning.

After the STA discovers the network, an authentication process may be performed in step S520. The authentication process may be referred to as a first authentication process to be clearly distinguished from the following security setup operation in step S540.

The authentication process may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group. These examples are some illustrative pieces of information that can be included in the authentication request/response frames and may be replaced with other information. Further, additional information may be further included.

The STA may transmit the authentication request frame to the AP. The AP may determine whether to allow the authentication of the STA on the basis of the information included in the received authentication request frame. The AP may provide the authentication processing result to the STA via the authentication response frame.

When the STA is successfully authenticated, an association process may be performed in step S530. The association process includes a process in which the STA transmits an association request frame to the AP and the AP transmits an association response frame to the STA in response.

The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability.

The association response frame may include, for eample, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

These examples are some illustrative pieces of information that can be included in the association request/response frames and may be replaced with other information. Further, additional information may be further included.

After the STA is successfully associated with the network, a security setup process may be performed in step S540. The security setup process in step S540 may be referred to as an authentication process through a robust security network association (RSNA) request/response. The authentication process in step S520 may be referred to as the first authentication process, and the security setup process in step S540 may be referred to simply as an authentication process.

The security setup process in step S540 may include a process of setting up a private key through four-way handshaking, for example, through an extensible authentication protocol over LAN (EAPOL) frame. Further, the security setup process may be performed according to a security method not defined in IEEE 802.11.

Medium Access Mechanism

In a WLAN system according to IEEE 802.11, a fundamental access mechanism of the medium access control (MAC) is a carrier sense multiple access with collision avoidance (CSMA/CA) mechanism. The CSMA/CA mechanism is also called a distributed coordination function (DCF) of the IEEE 802.11 MAC and basically employs a listen-before-talk access mechanism. According to this type of access mechanism, an AP and/or a STA may perform clear channel assessment (CCA) of sensing a radio channel or medium during a predetermined time interval (e.g., DCF inter frame space (DIFS)) before starting transmission. As a result of sensing, when the medium is determined to be idle, the AP and/or a STA starts to transmit a frame through the medium. When the medium is detected to be occupied, the AP and/or may configure a delay interval (e.g., a random backoff period) for medium access, may wait for the delay interval, and may then attempt to transmit a frame rather than starting transmission. As the random backoff period is applied, it is expected that a plurality of STAs attempts to transmit a frame after waiting for different times, thereby minimizing a collision.

Further, the IEEE 802.11 MAC protocol provides a hybrid coordination function (HCF). The HCF is based on the DCF and a point coordination function (PCF). The PCF is a polling-based synchronous access method, which refers to a periodic polling method that enables all receiving APs and/or STAs to receive a data frame. The HCF has enhanced distributed channel access (EDCA) and HCF-controlled channel access (HCCA). EDCA employs a contention-based access method for a provider to provide a data frame to a plurality of users, and HCCA employs a contention-free channel access method using a polling mechanism. Further, HCF includes a medium access mechanism to improve the QoS of a WLAN and can transmit QoS data both in a contention period (CP) and a contention-free period (CFP).

Figure 4:
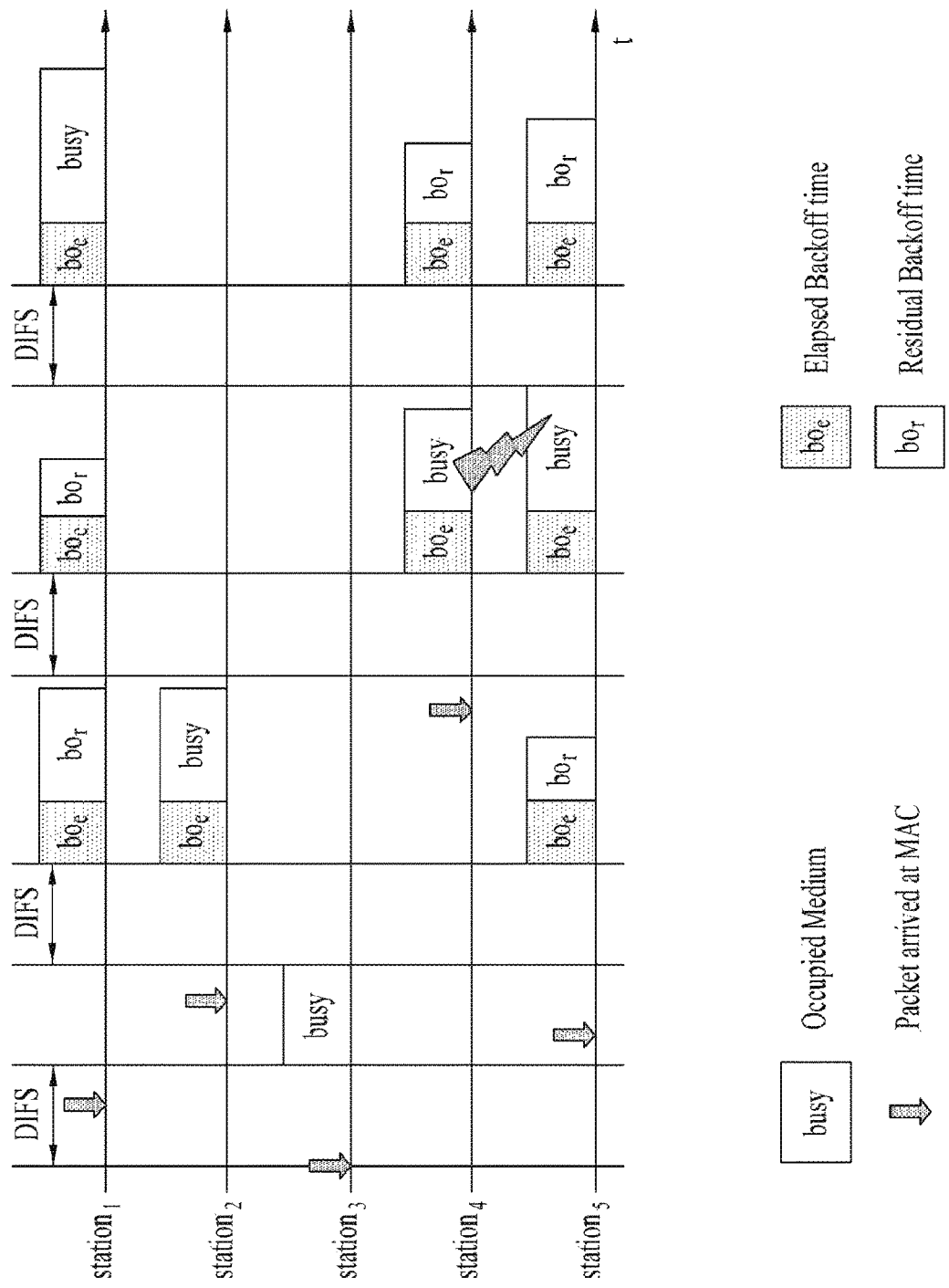
FIG. 4 illustrates a backoff process.

FIG. 4 illustrates a backoff process.

An operation based on a random backoff period is described with reference to FIG. 4. When an occupied or busy medium is changed to an idle status, a plurality of STAs may attempt to transmit data (or a frame). Here, to minimize a collision, each of the STAs may select a random backoff count, may wait for a slot time corresponding to the count, and may then attempt transmission. The random backoff count may have a packet number value and may be determined to be one value ranging 0 to CW. Here, CW is a contention window parameter value. The CW parameter is assigned CWmin as an initial value, and a double value may be taken when transmission fails (e.g., when an ACK of a transmitted frame is not received). When the CW parameter value is CWmax, the STAs may attempt data transmission while maintaining the CWmax value until data transmission is successful. When data transmission succeeds, the CW parameter value is reset to the CWmin value. The CW, CWmin, and CWmax values are preferably set to $2^n-1$ (n=-0, 1, 2, ... ).

When a random backoff process is started, a STA continue to monitor a medium while counting down backoff slots according to a determined backoff count value. When the monitored medium is in an occupied status, the STA suspends the countdown and waits. When the medium becomes idle, the STA resumes the remaining countdown.

Referring to FIG. 4, when a packet to transmit reaches the MAC of STA 3, STA 3 determines that a medium is idle for a DIFS and may immediately transmit a frame. The remaining STAs determine that the monitored medium is busy and waits. During this period, STA 1, STA 2, and STA 5 may have data to transmit. When the monitored medium is determined to be idle, each STA may wait for a DIFS and may then count down backoff slots according to a random backoff count value selected by each STA. In FIG. 4, STA 2 selects the smallest backoff count value, and STA 1 selects the largest backoff count value. That is, FIG. 4 shows that the remaining backoff time of STA 5 is shorter than the remaining backoff time of STA 1 at the time when STA 2 completes a backoff count and starts frame transmission. STA 1 and STA 5 suspend a countdown and wait while STA 2 is occupying the medium. When the medium occupied by STA2 is released and returns to the idle status, STA 1 and STA 5 wait for a DIFS and then resume the suspended backoff count. That is, STA 1 and STA 5 may count down remaining backoff slots equivalent to the remaining backoff time and may then start frame transmission. Since the remaining backoff time of STA 5 is shorter than that of STA 1, STA 5 starts to transmit a frame. STA 4 may also have data to transmit while STA 2 is occupying the medium. Here, when the medium becomes idle, STA 4 may wait for a DIFS, may then perform a countdown according to a random backoff count value selected by STA 4, and may start frame transmission. In FIG. 4, the remaining backoff time of STA 5 may accidentally coincide with the random backoff count value of STA 4, in which case a collision may occur between STA 4 and STA 5. When a collision occurs, both STA 4 and STA 5 cannot receive an ACK and thus fail to transmit data. In this case, STA 4 and STA 5 may double a CW value, may select a random backoff count value, and may perform a countdown. Meanwhile, while the medium is occupied due to transmission by STA 4 and STA 5, STA 1 may wait. Then, when the medium returns to the idle status, STA 1 may wait for a DIFS, and may start frame transmission after the elapse of the remaining backoff time.

Sensing Operation of STA

The CSMA/CA mechanism also includes virtual carrier sensing in addition to physical carrier sensing in which an AP and/or STA directly senses a media. Virtual carrier sensing is intended to solve any problems that may occur during media access, such as a hidden node problem. For virtual carrier sensing, the MAC of a WLAN system may use a network allocation vector (NAV). The NAV is a value that corresponds to the time remaining until a medium becomes available, which is indicated by an AP and/or STA currently using the medium or having the right to use the medium to another AP and/or STA. Therefore, a set NAV value corresponds to a period during which a medium is scheduled to be used by an AP and/or STA transmitting a corresponding frame, and a STA receiving the NAV value is prohibited from accessing the medium during the corresponding period. The NAV may be set according to, for example, the value of a Duration field of an MAC header of a frame.

Further, a robust collision detection mechanism is introduced in order to reduce the possibility of a collision, which is described with reference to FIG. 5 and FIG. 7. An actual carrier sensing range and a transmission range may not be the same but are assumed to be the same for the convenience of description.

FIG. 5 illustrates a hidden node and an exposed node.

FIG. 5(a) illustrates an example of a hidden node, in which STA A is communicating with STA B, and STA C has information to transmit. Specifically, STA A is transmitting information to STA B, but STA C may determine that a medium is idle when performing carrier sensing before transmitting data to STA B. This is because STA C may not sense transmission (i.e., occupancy of the medium) by STA A at the position of STA C. In this case, since STA B simultaneously receives information from both STA A and STA C, a collision occurs. Here, STA A may be a hidden node of STA C.

FIG. 5(b) illustrates an example of an exposed node, in which STA B is currently transmitting data to STA A, and STA C has information to transmit to STA D. In this case, when STA C performs carrier sensing, STA C may determine that a medium is occupied due to the transmission by STA B. Thus, although STA C has information to transmit to STA D, since the medium is sensed to be occupied, STA C needs to wait until the medium becomes idle. However, since STA A is actually out of the transmission range of STA C, there may be no collision between transmission from STA C and transmission from STA B for STA A, in which case STA C may unnecessarily wait until STA B stops transmission. Here, STA C is an exposed node of STA B.

FIG. 6 illustrates an RTS and a CTS.

To efficiently use the collision avoidance mechanism in the examples illustrated in FIG. 5, a short signaling packet, such as a request-to-send (RTS) packet and a clear-to-send (CTS) packet, may be used. A RTS/CTS between two STAs may allow overhearing of a neighboring STA(s), thus enabling the neighboring STA(s) to consider information transmission between the two STAs. For example, when a STA to transmit data transmits a RTS frame to a STA to receive the data, the STA receiving the data may transmit a CTS frame to neighboring STAs, thereby indicating that the STA will receive the data.

FIG. 6(a) illustrates an example of a method for solving a hidden node issue, in which it is assumed that both STA A and STA C attempt to transmit data to STA B. When STA A transmits a RTS to STA B, STA B transmits a CTS to both STA A and STA C which are around STA B. As a result, STA C waits until data transmission between STA A and STA B is completed, thus avoiding a collision.

FIG. 6 (b) illustrates an example of a method for solving an exposed node issue, in which STA C overhears RTS/CTS transmission between STA A and STA B and thus can determine that no collision occurs even though transmitting data to another STA (e.g., STA D). That is, STA B transmits a RTS to all neighboring STAs, and only STA A, which actually has data to transmit, transmits a CTS. Since STA C receives only the RTS and does not receive the CTS from STA A, STA C can determine that STA A is out of the carrier sensing of STC C.

Power Management

As described above, in the WLAN system, a STA needs to perform channel sensing before performing transmission and reception, and always sensing a channel causes continuous power consumption of the STA. Power consumption in a reception state is not significantly different from power consumption in a transmission state, and maintaining the reception state also causes a great burden on a STA having limited power (i.e., operating by a battery). Thus, when the STA maintains a reception standby state in order to continuously sense a channel, the STA inefficiently consumes power without any special advantage in the throughput of a WLAN. To solve this problem, the WLAN system supports a power management (PM) mode of a STA.

The power management mode of a STA is divided into an active mode and a power save (PS) mode. By default, a STA operates in the active mode. A STA operating in the active mode maintains an awake state. The awake state is a state in which a normal operation, such as frame transmission/reception and channel scanning, is possible. A STA operating in the PS mode operates, switching between a sleep state (or a doze state) and the awake state. A STA operating in the sleep state operates with minimal power and performs neither frame transmission and reception nor channel scanning.

As a STA operates in the sleep state as long as possible, power consumption is reduced, thus increasing the operating time of the STA. However, since it is impossible to transmit and receive frames in the sleep state, the STA cannot operate unconditionally for a long time. When the STA operating in the sleep state has a frame to transmit to an AP, the STA can switch to the awake state and can transmit the frame. On the other hand, when the AP has a frame to transmit to the STA, the STA in the sleep state cannot receive the frame and cannot recognize that there is the frame to receive. Therefore, the STA may need to periodically switch to the awake state in order to identify whether there is a frame to be transmitted to the STA (and to receive the frame if present).

The AP may periodically transmit a beacon frame to STAs in a BSS. The beacon frame may include a traffic indication map (TIM) information element. The TIM information element may include information indicating that the AP has buffered traffic for STAs associated with the AP and will transmit a frame. The TIM element includes a TIM used to indicate a unicast frame and a delivery traffic indication map (DTIM) used to indicate a multicast or broadcast frame.

Figure 7:
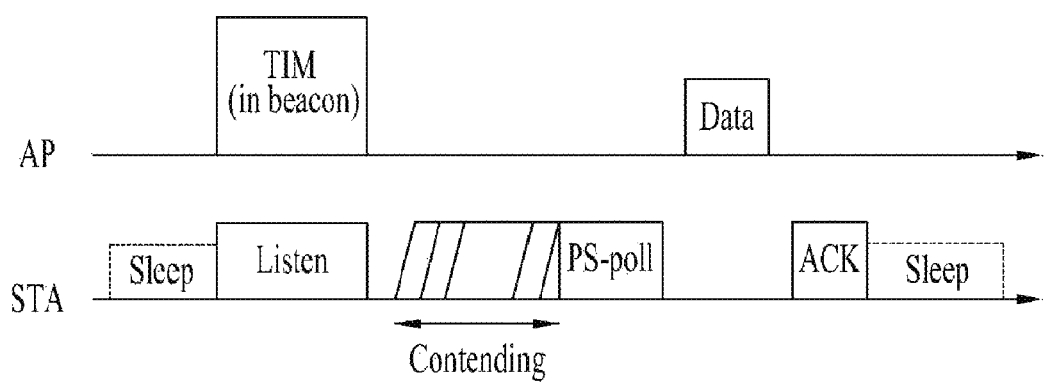
FIGS. 7 to 9 illustrate the operation of a STA receiving a TIM.
Figure 8:
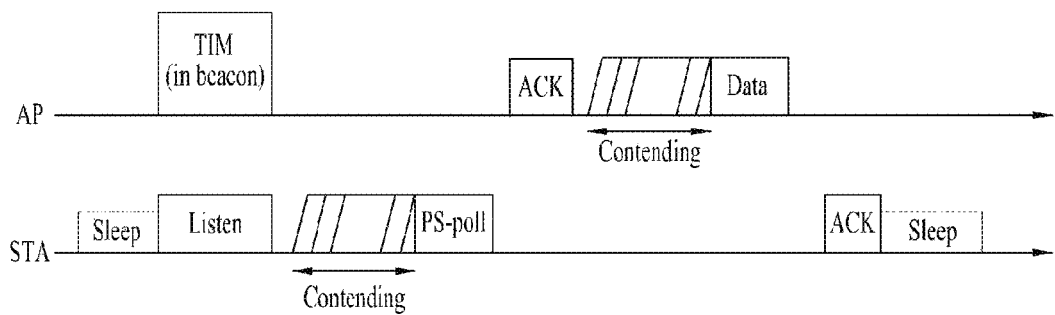
Figure 9:
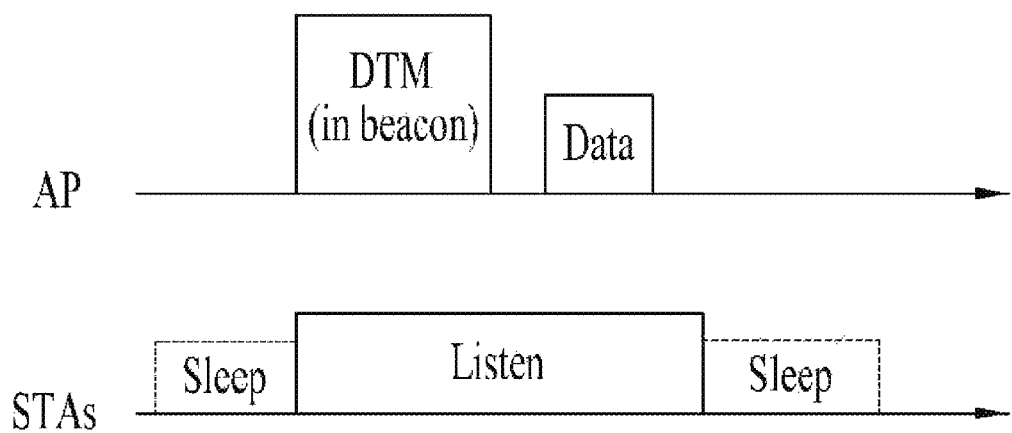

FIGS. 7 to 9 illustrate the operation of a STA receiving a TIM in detail.

Referring to FIG. 7, a STA switches from the sleep state to the awake state in order to receive a beacon frame including a TIM from an AP, and analyzes a received TIM element, thereby identifying that there is buffered traffic to be transmitted to the STA. After the STA contends with other STAs to access a medium for PS-Poll frame transmission, the STA may transmit a PS-Poll frame to the AP in order to request data frame transmission. Upon receiving the PS-Poll frame transmitted by the STA, the AP may transmit a frame to the STA. The STA may receive a data frame and may transmit an acknowledgment (ACK) frame of the data frame to the AP. The STA may then switch back to the sleep state.

As illustrated in FIG. 7, the AP may operate according to an immediate response mode of transmitting a data frame after a predetermined time (e.g., short inter-frame space (SIFS)) after receiving the PS-Poll frame from the STA. When the AP fails to prepare a data frame to transmit to the STA during the SIFS time after receiving the PS-Poll frame, the AP may operate according to a deferred response mode, which will be described with reference to FIG. 8.

In an example illustrated in FIG. 8, a STA switches from the sleep state to the awake state, receives a TIM from an AP, and transmits a PS-Poll frame to the AP via contention in the same manner as in the example of FIG. 7. When the AP receives the PS-Poll frame but fails to prepare a data frame during SIFS, the AP may transmit an ACK frame to the STA instead of a data frame. After the AP transmits the ACK frame, when a data frame is ready, the AP may perform contention and may then transmit the data frame to the STA. The STA may transmit an ACK frame indicating that the data frame has been successfully received to the AP and may switch to the sleep state.

FIG. 9 is an example in which an AP transmits a DTIM. STAs may switch from the sleep state to the awake state in order to receive a beacon frame including a DTIM element from an AP. The STAs can identify that a multicast/broadcast frame will be transmitted through a received DTIM. The AP may transmit data (i.e., the multicast/broadcast frame), without transmission and reception of a PS-Poll frame, immediately after transmitting the beacon frame including the DTIM. The STAs may receive the data while continuously maintaining the awake state after receiving the beacon frame including the DTIM, and may switch back to the sleep state after the data reception is completed.

General Frame Structure

Figure 10:
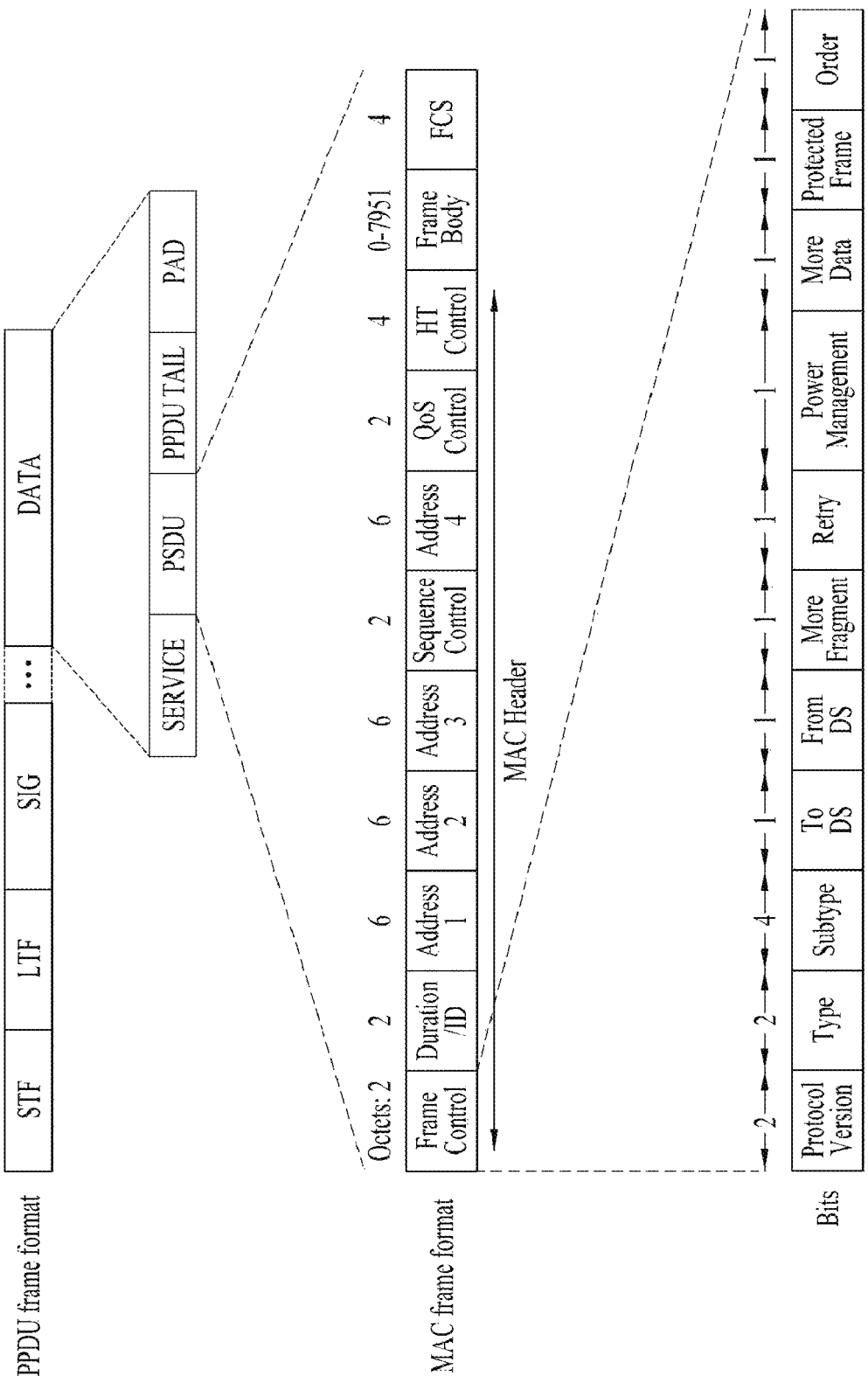
FIG. 10 illustrates an example of a frame structure used in an IEEE 802.11 system.

FIG. 10 illustrates an example of a frame structure used in an IEEE 802.11 system.

A physical-layer protocol data unit (PPDU) frame format may include a Short Training Field (STF), a Long Training Field (LTF), a Signal (SIG) field, and a Data field. A basic (e.g., non-high throughput (HT)) PPDU frame format may include a Legacy STF (L-STF), a Legacy-LTF (L-LTF), a SIG field, and a Data field only.

The STF is a signal for signal detection, automatic gain control (AGC), diversity selection, precise time synchronization, or the like, and the LTF is a signal for channel estimation, frequency error estimation, or the like. The STF and the LTF may be collectively referred to as a PLCP preamble, and the PLCP preamble may be a signal for synchronization of an OFDM physical layer and channel estimation.

The SIG field may include a Rate field and a Length field. The Rate field may include information on the modulation and coding rate of data. The Length field may include information about the length of data. Additionally, the SIG field may include a parity bit, a SIG tail bit, or the like.

The Data field may include a Service field, a physical layer service data unit (PSDU), and a PPDU tail bit, and may also include a padding bit if necessary. Some bits of the Service field may be used for synchronization of a descrambler at a receiver. The PSDU corresponds to an MAC protocol data unit (MPDU) defined in an MAC layer and may include data generated/used in a higher layer. The PPDU tail bit may be used to return an encoder to a zero state. The padding bit may be used to set the length of the Data field to a predetermined unit.

The MPDU is defined according to various MAC frame formats, and a basic MAC frame includes an MAC header, a frame body, and a frame check sequence (FCS). An MAC frame may be configured as an MPDU and may be transmitted/received via a PSDU of a data part of the PPDU frame format.

The MAC header includes a Frame Control field, a Duration/ID field, and an Address field. The Frame Control field may include pieces of control information necessary for frame transmission/reception. The Duration/ID field may be set to a time for transmitting a frame or the like.

The Duration/ID field included in the MAC header may be set to a 16-bit length (e.g., B0 to B15). Content included in the Duration/ID field may vary depending on the frame type and subtype, whether transmission is performed during a contention-free period (CFP), the QoS capability of a transmission STA, or the like. (i) In a control frame having a PS-Poll subtype, the Duration/ID field may include the AID of transmission STA (e.g., via 14 LSB bits), in which 2 MSB bits may be set to 1. (ii) In frames transmitted during a CFP by a point coordinator (PC) or a non-QoS STA, the Duration/ID field may be set to a fixed value (e.g., 32768). (iii) In other frames transmitted by a non-QoS STA or control frames transmitted by a QoS STA, the Duration/ID field may include a duration value defined for each frame type. In a data frame or a management frame transmitted by a QoS STA, the Duration/ID field may include a duration value defined for each frame type. For example, B15=0 set in the Duration/ID field indicates that the Duration/ID field is used to indicate TXOP duration, and B0-B14 may be used to indicate actual TXOP duration. The actual TXOP duration indicated by B0 to B14 may be one of 0 to 32767 and may have a unit in microseconds (us). However, when the Duration/ID field indicates a fixed TXOP duration value (e.g., 32768), B15 may be set to 1 and B0 to B14 may be set to 0. In addition, when B14=1 and B15=1, the duration/ID field is used to indicate an AID, and B0 to B13 indicate one of AIDs from 1 to 2007. Details about sequence Control, QoS Control, and HT Control subfields of the MAC header are provided in IEEE 802.11 specifications.

The Frame Control field of the MAC header may include Protocol Version, Type, Subtype, To DS, From DS, More Fragment, Retry, Power Management, More Data, Protected Frame, Order subfields. Each subfield of the frame control field is mentioned in IEEE 802.11 specifications.

HT Control Field

Hereinafter, the HT Control field included in the MAC header is described.

In a WLAN system supporting 11ax, the HT Control field may be configured in one format among an HT variant (e.g., in 11n), a VHT variant (e.g., in 11ac), and an HE variant (e.g., in 11ax) illustrated in Table 1.

TABLE 1

| Variant | Bit 0 (value) | Bit 1 (value) | Bit 2-29 | Bit 30 | Bit 31 |
| --- | --- | --- | --- | --- | --- |
| HT variant | VHT (0) | | HT Control Middle | AC Constraint | RDG/More PPDU |
| VHT variant | VHT (1) | HE (0) | VHT Control Middle | AC Constraint | RDG/More PPDU |
| HE variant | VHT (1) | HE (1) | Aggregated Control | | |

When the first bit (Bit 0) of the HT Control field is set to 0, the HT Control field corresponds to the HT variant. The HT variant includes an HT Control Middle, an Access Category (AC) Constraint, and a Reverse Direction Grant (RDG)/More PPDU.

When the first bit (Bit 0) of the HT Control field is set to 1 and the second bit (Bit 1) is set to 0, the HT Control field corresponds to the VHT variant. The VHT variant includes a VHT Control Middle, an AC Constraint, and an RDG/More PPDU.

When the first bit (Bit 0) of the HT Control field is set to 1 and the second bit (Bit 1) is set to 1, the HT Control field corresponds to the HE variant. The HE variant includes an Aggregated Control (A-Control).

FIG. 11 illustrates the VHT Control Middle subfield of the VHT variant in a WLAN system supporting 11ax.

As illustrated in Table 1, in the WLAN system supporting 11ax, since the second bit (Bit 1) of the HT Control field, that is, a B1 bit corresponding to a Reserved in FIG. 11, is used as an HE indication bit, B2 to B20 correspond to the VHT Control Middle subfield.

The VHT Control Middle includes an MRQ, an MSI/STBC, an MFB Sequence Identifier (MFSI)/GID-L, an MFB, a GID-H, a Coding Type, an FB Tx Type, and an Unsolicited MFB. The MRQ indicates a VHT-MCS feedback request. The MSI indicates an MRQ sequence identifier, and the STBC indicates a space-time block code indication. The MFB is information about the number of space-time streams (NUM_STS), a VHT-MCS, a bandwidth (BW), and SNR feedback. The MFSI indicates the identifier of an MFB sequence, and the GID-L indicates the LSBs of a group ID. The GID-H indicates the MSBs of a group ID. The FB Tx Type indicates the transmission type of a measured PPDU. The Unsolicited MFB indicates an unsolicited VHT-MCS feedback indicator. Details about the VHT Control Middle are provided in IEEE 802.11 specifications.

Figure 12:
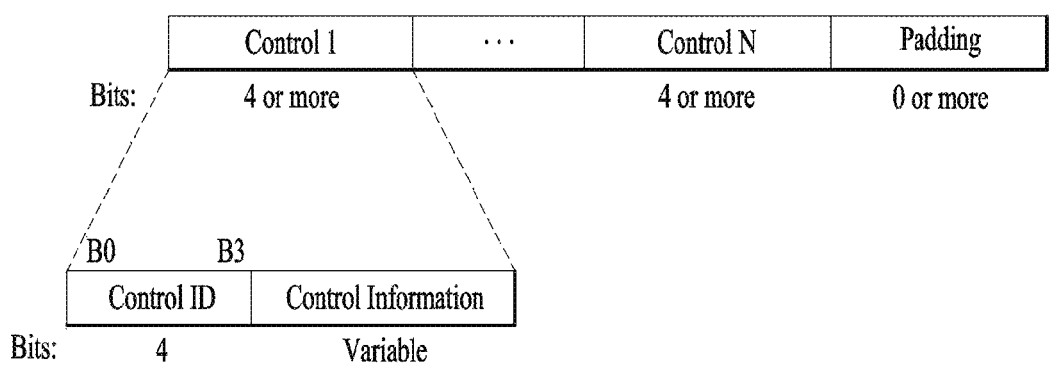
FIG. 12 illustrates an A-Control subfield of an HE variant in a WLAN system supporting 11ax.

FIG. 12 illustrates the A-Control subfield of the HE variant in a WLAN system supporting 11ax.

Referring to FIG. 12, the A-Control subfield corresponds to an aggregation of at least one or two or more Control subfields, and a padding sequence (e.g., zero padding) may be included in the A-Control subfield in order to adjust the length of the A-Control subfield to 30 bits.

Each Control subfield includes a Control ID of 4 bits and a Control Information. The size of the Control Information may be variable according to the Control ID. The Control ID indicates the type of control information. Table 2 shows control information types according to the Control ID.

TABLE 2

| Control ID | Length of Control Information (bits) | Contents of Control Information |
| --- | --- | --- |
| 0 | 26 | UL MU response scheduling |
| 1 | 12 | Operating mode |
| 2 | 16 | HE link adaptation |
| 3 | 26 | Buffer status report |
| 4 | 8 | UL power headroom |
| 5-15(Reserved) | — | — |

FIG. 13 illustrates a Control Information for uplink multi-user response scheduling where the Control ID is 0. Referring to FIG. 13, a UL PPDU Length subfield indicates the length of an HE trigger-based PPDU response and is set to the number of OFDM symbols that is a Data field of an HE trigger-based PPDU minus one. An RU Allocation subfield indicates a resource unit (RU) allocated for transmission of the HE trigger-based PPDU response. A DL TX Power subfield indicates AP transmission power used for a soliciting frame in dBm. A UL Target RSSI subfield indicates AP target reception power for a STA responding when transmitting a HE trigger-based PPDU, i.e., an average RSSI for all AP antennas in dBm. A UL MCS subfield indicates an MCS from MCS0 to MCS3 used by a reception STA for the HE trigger-based PPDU.

FIG. 14 illustrates a Control Information for indicating an operating mode where the Control ID is 1. Referring to FIG. 14, an Rx NSS subfield is set to a value of the maximum number of spatial streams that a STA can receive, NSS, minus one. A Channel Width subfield indicates an operating channel width supported by a STA in reception, and is set to 0 in 20 MHz, 1 in 40 MHz, 2 in 80 MHz, and 3 in 160 MHz and 80+80 MHz. A UL MU Disable subfield indicates whether a UL MU operation is temporarily suspended or resumed by a non-AP STA. The UL MU Disable subfield is set to 1 to indicate that the UL MU operation has been temporarily suspended. An AP sets the UL MU Disable subfield to zero. A Tx NSS subfield is set to a value of the maximum number of spatial streams that a STA can transmit, NSS, minus one.

FIG. 15 illustrates a Control Information for HE link adaptation where the Control ID is 2. FIG. Referring to FIG. 15, an NSS subfield indicates the recommended number of spatial streams, NSS, and is set to NSS-1. An HE-MCS subfield indicates a recommended HE-MCS and is set to an HE-MCS index value. A Dual Carrier Modulation (DCM) subfield is set to 1 when DCM is recommended.

FIG. 16 illustrates a Control Information for a buffer status report (BSR) where the Control ID is 3.

Referring to FIG. 16, an ACI Bitmap subfield indicates an access category for which a buffer status is reported. Encoding of the ACI Bitmap subfield is illustrated in Table 3.

TABLE 3

| B0 | B1 | B2 | B3 |
|---|---|---|---|
| BK (Background) | BE (Best effort) | VI (Video) | VO (Voice) |

In Table 3, each bit in the ACI Bitmap may be set to 1 to indicate the buffer status of an access category.

A combination of a Delta Traffic Identifier (TID) subfield and the AC Bitmap subfield indicates the number of TIDs for which a STA reports a buffer status. Table 4 shows encoding of the Delta TID subfield.

TABLE 4

| Number of bits in the ACI Bitmap subfield that are set to 1 | Mapping of Delta TID subfield value and number of TIDs, $N_{TID}$ |
|---|---|
| 0 | Values 0 to 2 are not applicable; Value 3 indicates 8 TIDs (i.e., all ACs have traffic) |
| 1 | Value 0 indicates 1 TID; Value 1 indicates 2 TIDs; Values 2 to 3 are not applicable; |
| 2 | Value 0 indicates 2 TID; Value 1 indicates 3 TIDs; Value 2 indicates 4 TIDs; Value 3 are not applicable; |
| 3 | Value 0 indicates 3 TID; Value 1 indicates 4 TIDs; Value 2 indicates 5 TIDs; Value 3 indicates 6 TIDs; |
| 4 | Value 0 indicates 4 TID; Value 1 indicates 5 TIDs; Value 2 indicates 6 TIDs; Value 3 indicates 7 TIDs; |

An ACI High subfield indicates the ACI of an access category for a BSR indicated in a Queue Size High subfield.

A Scaling Factor (SF) subfield indicates a unit SF of a Queue Size subfield in octets. The Scaling Factor subfield indicates 16 octets when set to 0, 128 octets when set to 1, 2048 octets when set to 2, and 16384 octets when set to 3.

The Queue Size High subfield indicates the amount of traffic buffered with respect to an access category identified by the ACI High subfield in SF octets. For example, the Queue Size High subfield and the ACI High subfield may be about high-priority traffic. A non-AP STA may determine traffic to be assigned a high priority. For example, high-priority traffic may be determined in consideration of the importance of traffic, QoS delay requirements, the amount of buffered traffic, or the like, but is not limited thereto.

A Queue Size All subfield indicates the amount of traffic buffered with respect to any access category identified by the ACI Bitmap subfield in SF octets.

Queue size values in the Queue Size High subfield and the Queue Size All subfield indicate the total size of all MSDUs and A-MSDUs buffered for a STA that is rounded up to the nearest multiple of an SF octet. Here, all the MSDUs and A-MSDUs buffered for the STA include MSDUs or A-MSDUs included in a current (A-)MPDU. Queue Size 254 is used for any size greater than 254*SF octet. Queue Size 255 is used to indicate an unspecified or unknown size. If a QoS data frame is fragmented and is not transmitted through an A-MPDU, even though the amount of traffic buffered in a queue changes as the fragments are sequentially transmitted, the queue size value may be fixed at a constant for all fragments.

Figure 17:
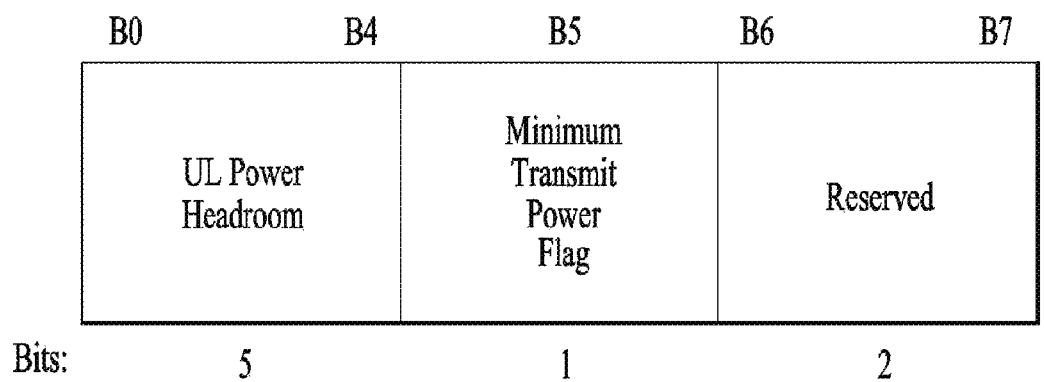
FIG. 17 illustrates control information for reporting uplink (UL) power headroom.

FIG. 17 illustrates a Control Information for reporting uplink (UL) power headroom where the Control ID is 4. FIG. Referring to FIG. 17, five LSBs (B0-B4) of a UL Power Headroom subfield indicates available power headroom for a current MCS in dB. UL power headroom reported via the UL Power Headroom subfield is 1 dB in resolution. The UL Power Headroom subfield is set to one of 0 to 31 dB. B5 in the UL Power Headroom subfield is set to one when a STA reaches the minimum transmission power for the current MCS. Otherwise, B5 in the UL Power Headroom subfield is set to zero.

Method for Transmitting TX Power Headroom and BSR Together

Hereinafter, a method for a STA to transmit an HE Variant HT Control field in a next-generation WLAN system (e.g., 802.11ax), particularly a method for transmitting UL power headroom information together with other information is proposed.

As mentioned above, UL power headroom information may be transmitted over an HT Variant HT Control field. For example, UL power headroom information may be transmitted along with other pieces of information (e.g., HE link adaptation or operating mode indication) through an A-Control field. However, since the maximum size of the A-Control field is 30 bits, it is impossible to transmit the UL power headroom information together with buffer status report (BSR) information through the A-Control field. Specifically, BSR information is 26 bits in FIG. 16, and UL power headroom information is 8 bits in FIG. 17.

In order to solve this problem, the present invention proposes a method for transmitting UL power headroom information and BSR information through one PPDU.

Example 1: Method Using A-MPDU

Figure 18:
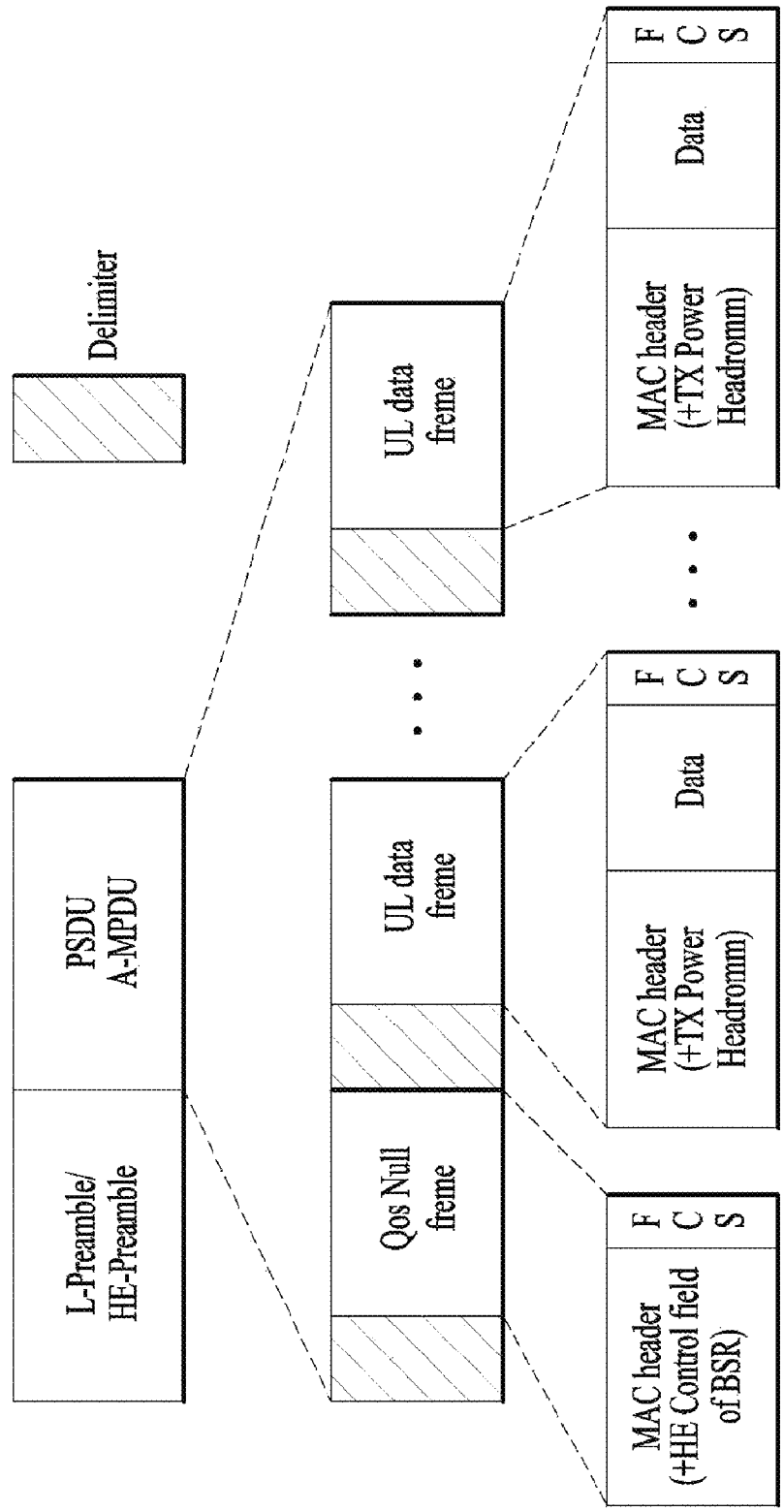
FIG. 18 illustrates an A-MPDU for transmitting UL power headroom information and BSR information according to an embodiment of the present invention.

FIG. 18 illustrates an aggregation (A)-MPDU for transmitting UL power headroom information and BSR information according to an embodiment of the present invention.

According to the present embodiment, in order to transmit a BSR and UL power headroom information via one PPDU, a STA transmits the BSR information through a QoS null frame and transmits the UL power headroom information through a HT Control field.

According to a conventional A-MPDU, a QoS null frame and a UL data frame cannot be transmitted together. However, referring to FIG. 18, a QoS null frame and a UL data frame are aggregated into one A-MPDU. The BSR is transmitted through an HE Variant HT A-Control field included in an MAC header of the QoS null frame, and the UL power headroom is transmitted through an HE Variant HT A-Control field included in an MAC header of the data frame.

If the A-MPDU includes a plurality of UL data frames, an MAC header of each UL data frame may include the same UL power headroom. Thus, UL power headroom may be transmitted a plurality of times, thereby improving reliability.

Figure 19:
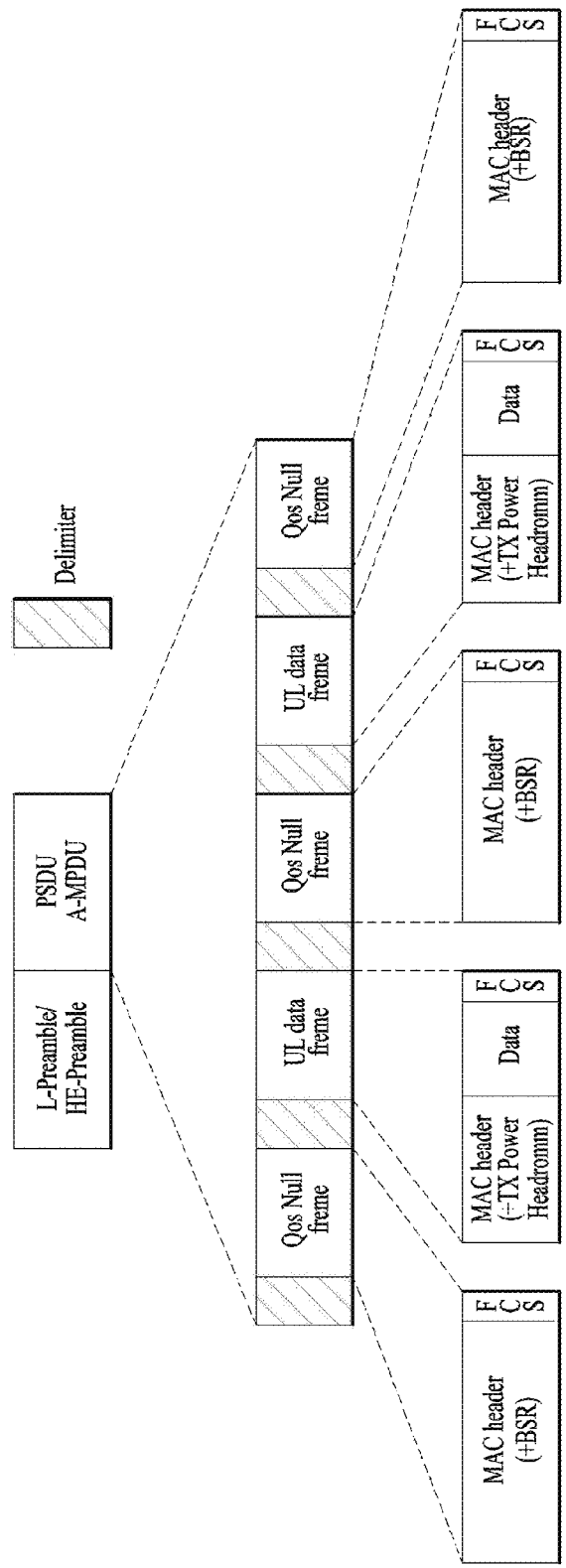
FIG. 19 illustrates an A-MPDU for transmitting UL power headroom information and BSR information according to another embodiment of the present invention.

For the reliability of the BSR, one or more QoS null frames including the BSR may be included the A-MPDU. For example, referring to FIG. 19, QoS null frames for BSR transmission exist as MPDUs at the beginning, middle, and end of an A-MPDU.

Figure 20:
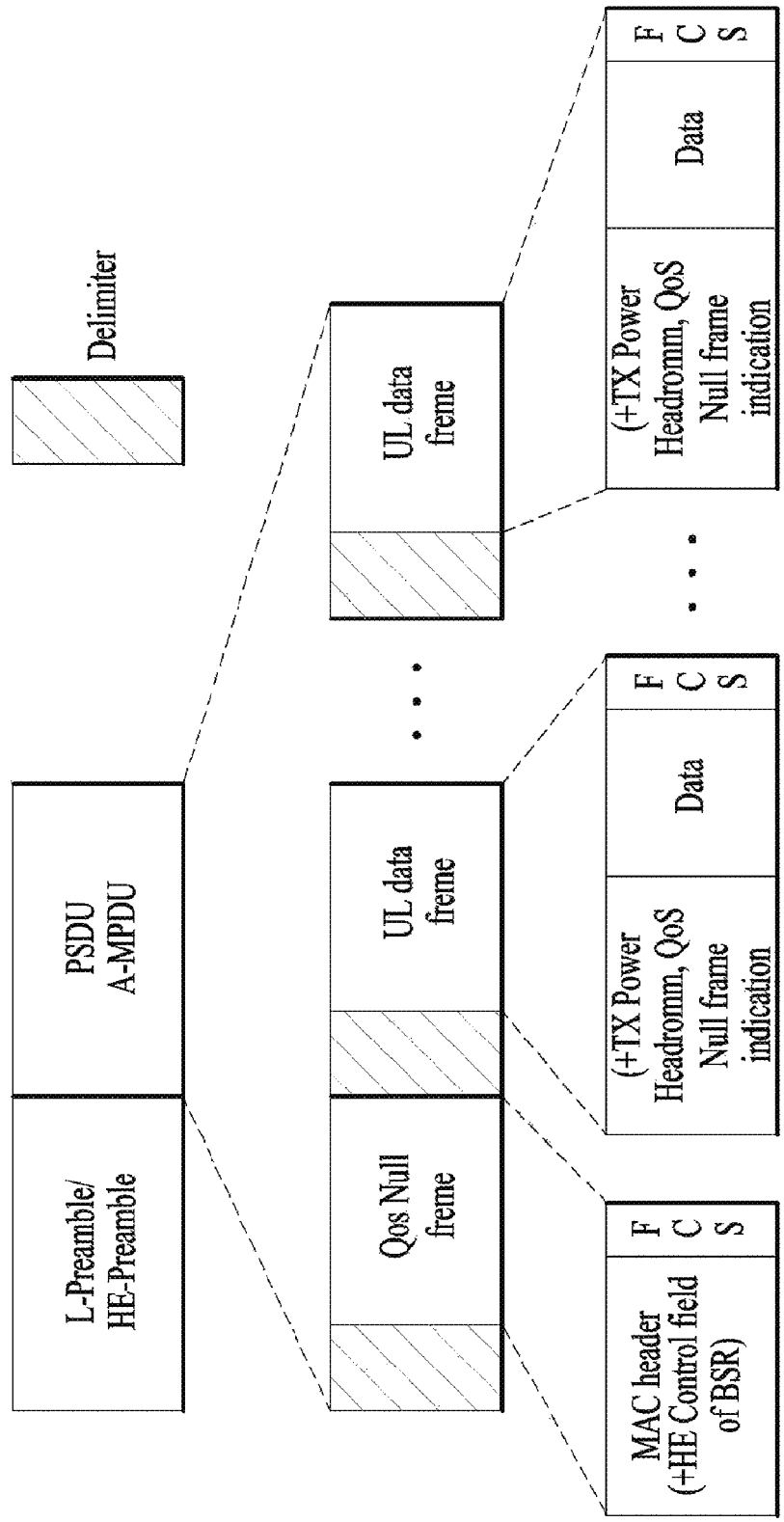
FIG. 20 illustrates an A-MPDU for transmitting UL power headroom information and BSR information according to still another embodiment of the present invention.

Referring to FIG. 20, an MAC header of an MPDU (e.g., UL data frame) including UL power headroom may include information (e.g., a QoS null frame indication) indicating that a QoS null frame including a BSR is currently included in an A-MPDU.

The QoS null frame indication may be configured using an unoccupied field (e.g., a reserved bit) in a Frame Control (FC) field of the MAC header or may be newly defined in an HE Variant HT Control field including UL power headroom.

FIG. 21 illustrates an example of newly defining a QoS Null Frame Indication field in an HE Variant HT Control field including UL power headroom. Referring to FIG. 21, B6 of control information including UL power headroom indicates whether a QoS null frame including a BSR is currently included in an A-MPDU.

The QoS null frame for transmitting the BSR may be located at a middle or last MPDU of the A-MPDU.

Figure 22:
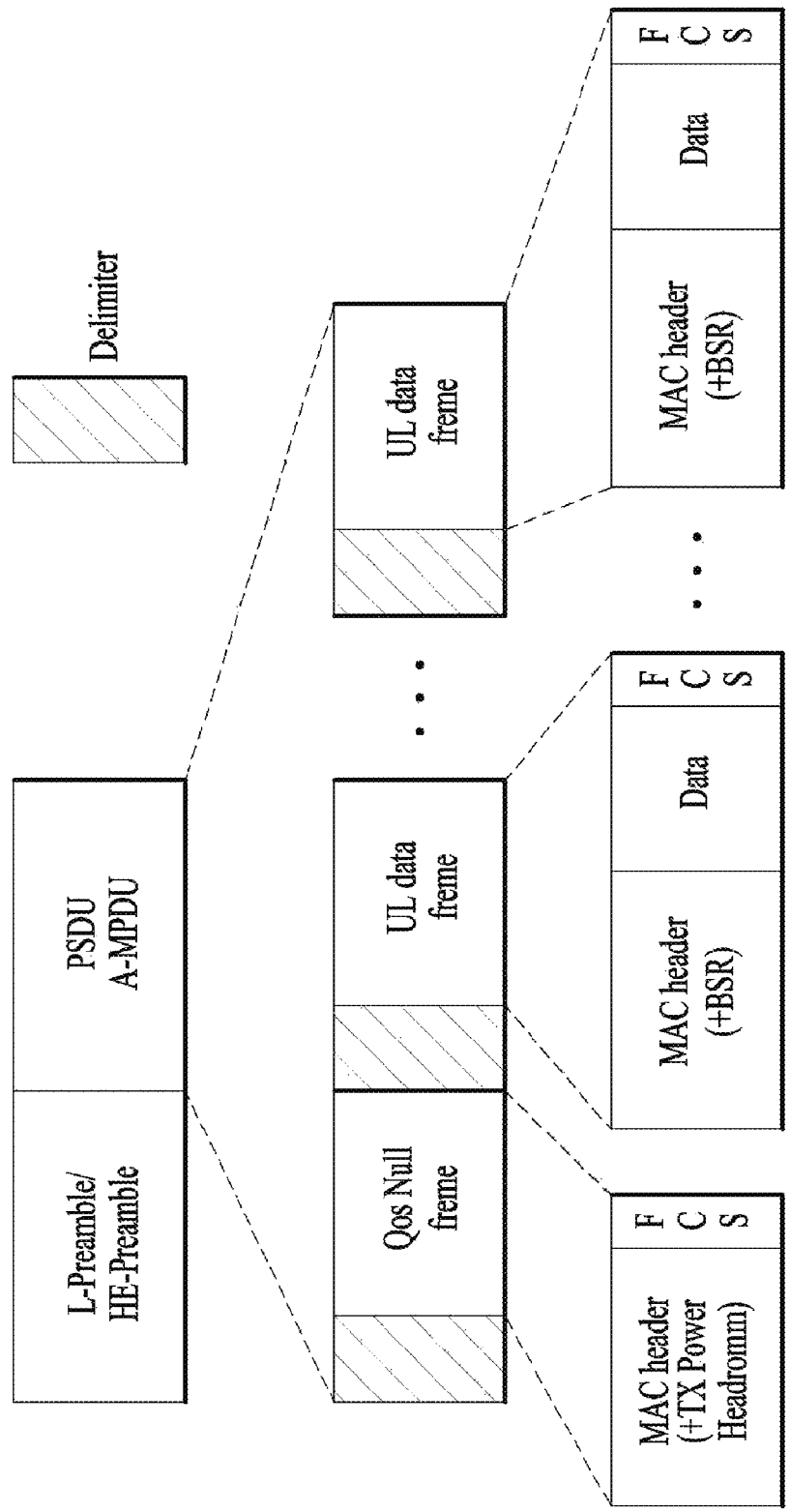
FIG. 22 illustrates an A-MPDU for transmitting UL power headroom information and BSR information according to yet another embodiment of the present invention.

FIG. 22 illustrates an A-MPDU for transmitting UL power headroom information and BSR information according to another embodiment of the present invention. In the foregoing embodiment, BSR information is transmitted through a QoS null frame. However, according to the embodiment of FIG. 22, UL power headroom information is transmitted through an HE Variant HT A-Control field included in an MAC header of a QoS null frame. In this case, BSR information is transmitted through an HE Variant HT A-Control field included in an MAC header of a data frame.

Example 2: Method Using Short BSR

According to an embodiment of the present invention, a short BSR may be newly defined so that an HT Variant HT Control field may include both BSR information and UL power headroom information. For example, a new HT Variant HT Control field including important BSR information may be defined. The term 'short BSR' is for convenience of description and may also be referred to as another term, such as a compressed BSR.

One value of control ID values may indicate a short BSR. For example, one of reserved values (e.g., 5 to 15) not used as control ID values in Table 2 may be used as a value for indicating a short BSR.

FIG. 23 illustrates short BSR information according to an embodiment of the present invention.

When a control ID indicates a short BSR, control information including the short BSR may include ACI Bitmap, Delta TID, Scaling Factor, and Queue Size All fields. Compared to the BSR shown in FIG. 16, ACI High and Queue Size High are omitted in the short BSR. However, the same bit sizes and formats as defined for the ACI Bitmap, Delta TID, Scaling Factor, and Queue Size All subfields for the BSR in FIG. 16 are used for the short BSR in FIG. 23. Therefore, the short BSR shown in FIG. 23 is a total of 16 bits.

If the short BSR includes 16 bits and UL power headroom includes 8 bits as in FIG. 17, the short BSR+the UL power headroom is 24 bits and thus does not exceed 30 bits of the A-Control. Thus, it is possible to transmit the short BSR and the UL power together via the A-Control. For example, the short BSR may be included in a Control 1 of the A-Control in FIG. 12, and the UL power headroom may be included in a Control 2.

Although it is assumed in FIG. 23 that the same bit sizes and formats are used for the ACI Bitmap, Delta TID, Scaling Factor, and Queue Size All subfields, some of the subfields may be changed in a short BSR variant according to another embodiment of the present invention.

FIG. 24 illustrates short BSR information according to another embodiment of the present invention.

Referring to FIG. 24, the same bit sizes are used such that an ACI bitmap is 4 bits, a Delta TID is 2 bits, and a Scaling Factor is 2 bits. However, a Queue Size All includes 6 bits instead of 8 bits. For example, compared to that in FIG. 16, the size of the Queue Size All subfield in a short BSR is reduced by 2 bits.

Since the size of the Queue Size All subfield is reduced by 2 bits, the format of the Queue Size All subfield may be changed. For example, a method for a transmitter to set a Queue Size All subfield and a method for a receiver to interpret a Queue Size All subfield may be newly defined.

The Queue Size All subfield of the short BSR indicates, in SF octets, the amount of traffic buffered with respect to any access category identified by the ACI Bitmap subfield.

A queue size value in the Queue Size All subfield of the short BSR indicate the total size of all MSDUs and A-MSDUs buffered for a STA that is rounded up to the nearest multiple of an SF octet. Here, all the MSDUs and A-MSDUs buffered for the STA include MSDUs or A-MSDUs included in a current (A-)MPDU. Queue Size 62 is used for any size greater than 62*SF octet. Queue Size 63 is used to indicate an unspecified or unknown size. If a QoS data frame is fragmented and is not transmitted through an A-MPDU, even though the amount of traffic buffered in a queue changes as the fragments are sequentially transmitted, the queue size value may be fixed at a constant for all fragments.

For example, 254 is used to indicate a queue size exceeding 254*SF octet in the BSR of FIG. 16, while 62 is used to indicate a queue size exceeding 62*SF octet in the short BSR of FIG. 24. Further, 255 is used to indicate an unspecified or unknown queue size in the BSR of FIG. 16, while 63 is used to indicate an unspecified or unknown queue size in the short BSR of FIG. 24.

FIG. 25 illustrates short BSR information according to still another embodiment of the present invention. In FIG. 25, the size of a Queue Size All includes 7 bits.

A Queue Size All subfield of a short BSR indicates, in SF octets, the amount of traffic buffered with respect to any access category identified by the ACI Bitmap subfield.

A queue size value in the Queue Size All subfield of the short BSR indicate the total size of all MSDUs and A-MSDUs buffered for a STA that is rounded up to the nearest multiple of an SF octet. Here, all the MSDUs and A-MSDUs buffered for the STA include MSDUs or A-MSDUs included in a current (A-)MPDU. Queue Size 126 is used for any size greater than 126*SF octet. Queue Size 127 is used to indicate an unspecified or unknown size. If a QoS data frame is fragmented and is not transmitted through an A-MPDU, even though the amount of traffic buffered in a queue changes as the fragments are sequentially transmitted, the queue size value may be fixed at a constant for all fragments.

For example, 254 is used to indicate a queue size exceeding 254*SF octet in the BSR of FIG. 16, while 126 is used to indicate a queue size exceeding 126*SF octet in the short BSR of FIG. 25. Further, 255 is used to indicate an unspecified or unknown queue size in the BSR of FIG. 16, while 127 is used to indicate an unspecified or unknown queue size in the short BSR of FIG. 25.

FIG. 26 illustrates short BSR information according to yet another embodiment of the present invention.

Referring to FIG. 26, a Queue Size All subfield has a size of 8 bits, which is the same as in FIG. 16, but the size of a Scaling Factor subfield is reduced to 1 bit.

Since the size of the Scaling Factor subfield is reduced by 1 bit, the format of the Scaling Factor subfield may be changed. For example, a method for a transmitter to set a Scaling Factor subfield and a method for a receiver to interpret a Scaling Factor subfield may be newly defined.

The Scaling Factor subfield may indicates a unit SF of a Queue Size subfield in octets. For example, one of options shown in Table 5 may be used.

TABLE 5

| Option | SF 1-bit = 0 | SF 1-bit = 1 |
| --- | --- | --- |
| 1 | 16 octets | 128 octets |
| 2 | 16 octets | 2048 octets |
| 3 | 16 octets | 16384 octets |
| 4 | 128 octets | 2048 octets |
| 5 | 128 octets | 16384 octets |
| 6 | 2048 octets | 16384 octets |

Figure 27:
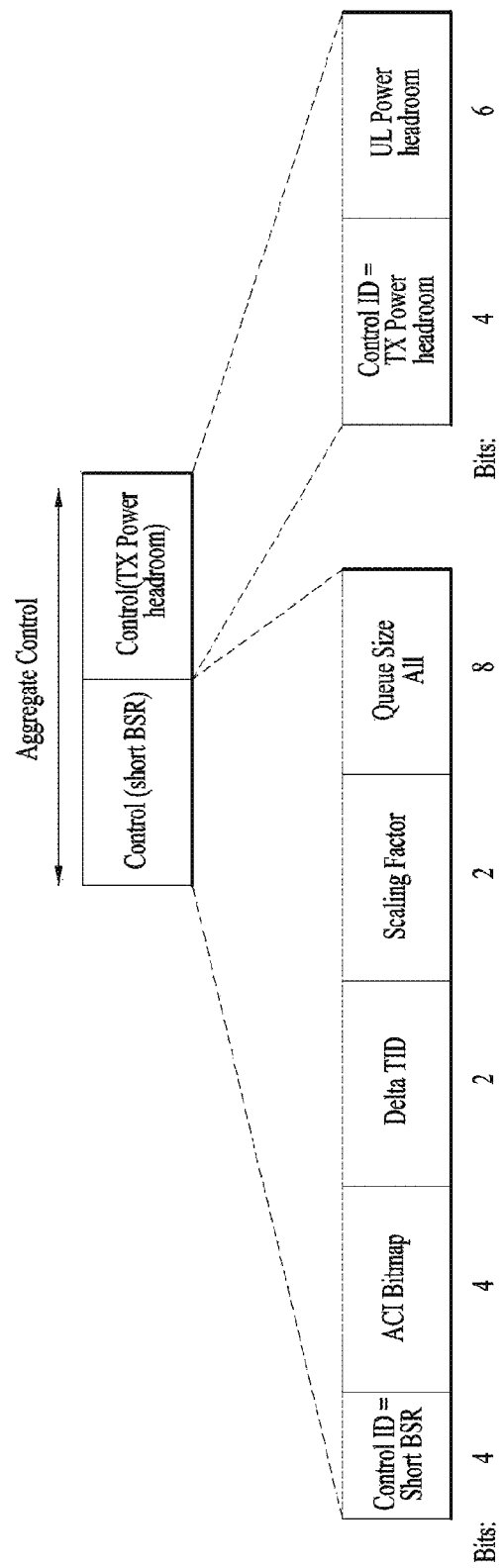
FIG. 27 illustrates an HE Variant A-Control field including a short BSR and UL power headroom according to an embodiment of the present invention.

The present invention is not limited to the options in Table 5, and other octet values may be indicated via SF 1 bit FIG. 27 illustrates an HE Variant A-Control field including a short BSR and UL power headroom according to an embodiment of the present invention.

The short BSR in FIG. 27 is the same as the example in FIG. 23.

However, compared to FIG. 17, the size of control information of UL power headroom is reduced from 8 bits to 6 bits. For example, the control information of the UL power headroom in FIG. 27 may include only 6 bits of UL power headroom control information (e.g., 5-bit UL power headroom indicating 0 to 31 dBm+1-bit minimum transmission power flag) excluding reserved 2 bits.

In the short BSRs illustrated in FIGS. 23 to 27, an ACI High subfield and a Queue Size High subfield are omitted. According to one embodiment of the invention, it may be omitted to transmit an ACI High subfield and a Queue Size High subfield. According to another embodiment, however, a method of transmitting an ACI High subfield and a Queue Size High subfield omitted in the short BSRs through a part other than an HE Variant A-Control field may be considered. For example, information corresponding to an ACI High subfield and a Queue Size High subfield omitted from the short BSRs may be transmitted through a field other than a HT Control field of an MAC header. The other field may be, for example, a QoS Control field.

Referring to FIG. 10, the QoS Control field corresponds to a total of 16 bits. Various description methods of the QoS Control field are defined in the 802.11 specifications. For example, when a non-AP STA transmits a QoS null frame, the QoS Control field may be set as in Table 6 according to the 802.11 specifications.

TABLE 6

| Bit 0-3 | Bit 4 | Bit 5-6 | Bit 7 | Bit 8-15 |
| --- | --- | --- | --- | --- |
| TID | 0 | Ack Policy | Reserved | TXOP Duration Requested |
| TID | 1 | Ack Policy | Reserved | Queue Size |

Referring to Table 6, Bits 0 to 3 of the Qos Control field indicate a TID, and Bit 4 indicates whether Bits 8 to 15 correspond to a TXOP Duration Requested or a Queue Size. Bit 7 is a reserved bit that is unoccupied.

According to an embodiment of the present invention, an HE Variant A-control including a short BSR and UL power headroom is transmitted through an HT Control field. If a frame is a QoS null frame, ACI High and Queue Size High information omitted from the short BSR may be transmitted through a QoS Control field. For example, an Access Category corresponding to a TID set in the QoS Control field included in the QoS null frame may be interpreted as indicating ACI High, and a Queue Size may be interpreted as indicating a Queue Size High of the corresponding AC.

Figure 28:
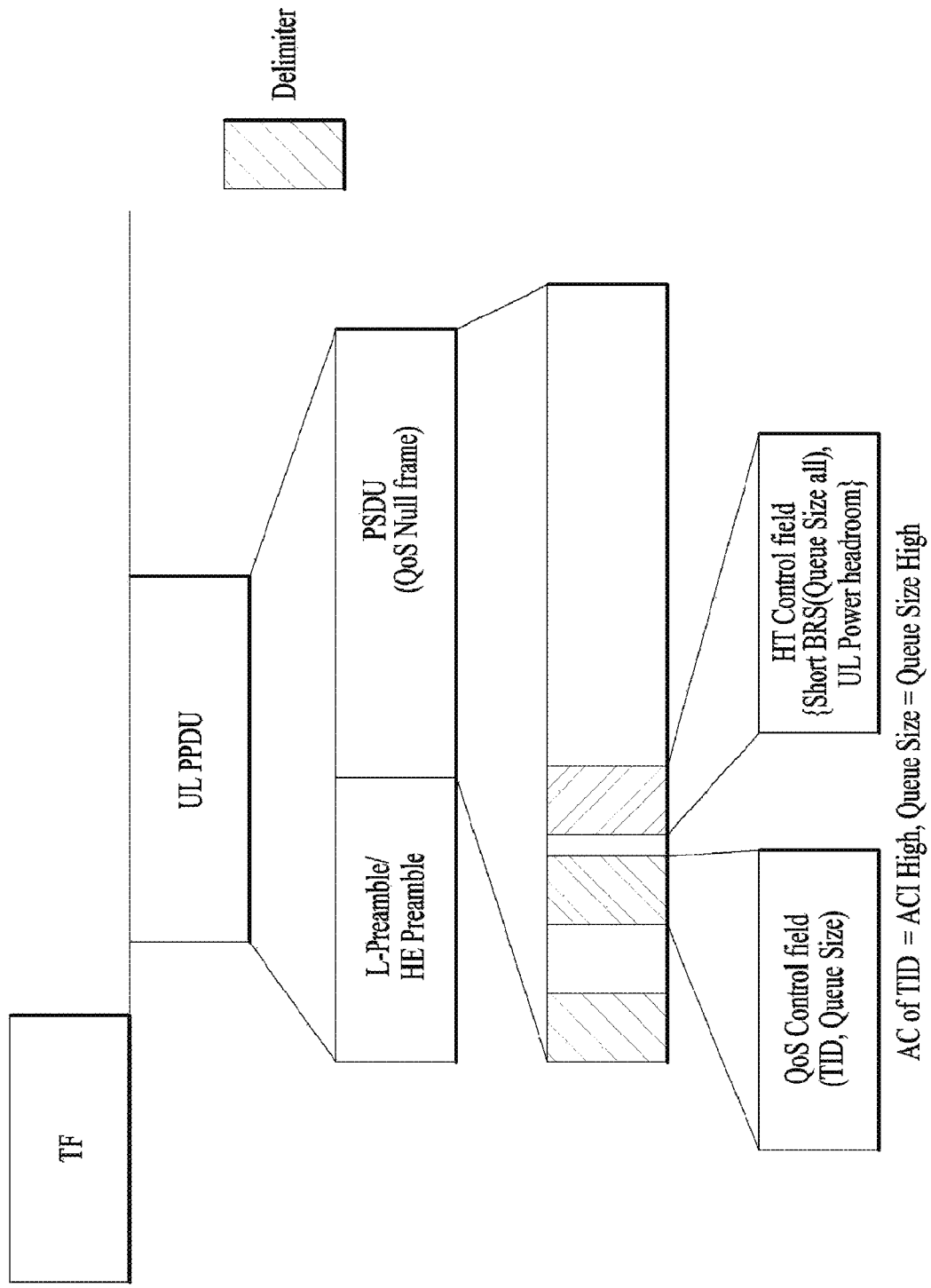
FIG. 28 illustrates a frame for transmitting an ACI High and a Queue size High through a QoS Control field according to an embodiment of the present invention.

FIG. 28 illustrates a frame for transmitting an ACI High and a Queue size High through a QoS Control field according to an embodiment of the present invention.

For example, when a QoS Control field is included along with a Short BSR HE Variant HT Control field in a QoS null frame, the AC of a TID subfield in the QoS Control field is an ACI High, a Queue Size is a Queue Size High, and Queue Size All information is provided in a Short BSR HE Variant. Accordingly, pieces of information included in a BSR HE Variant HT Control field may be provided without omission using the QoS Control field and the Short BSR HE Variant HT Control field included in the QoS null frame.

Figure 29:
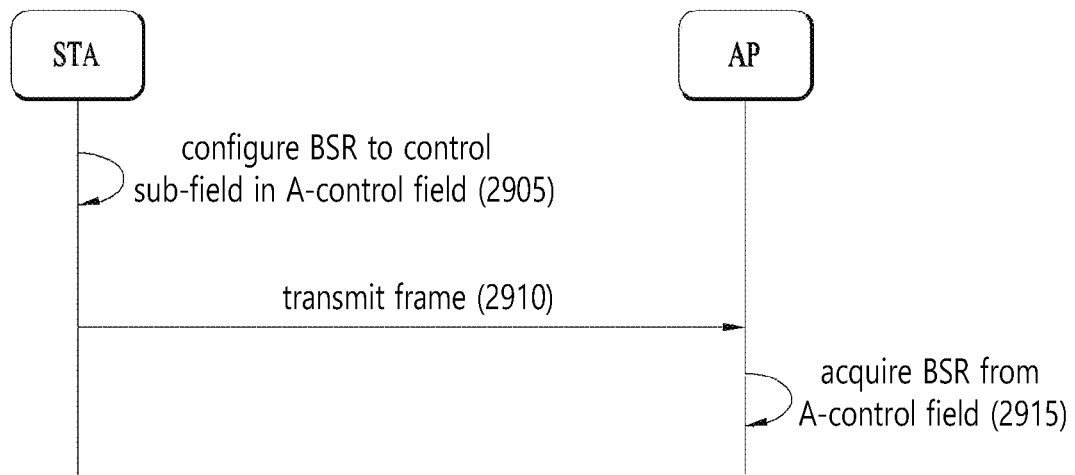
FIG. 29 illustrates the flow of a method of transmitting and receiving a frame according to an embodiment of the present invention.

FIG. 29 illustrates the flow of a method of transmitting and receiving a frame according to an embodiment of the present invention. Details overlapping with those explained above may be omitted.

Referring to FIG. 29, a STA configures a BSR of the STA in a first control subfield among one or two or more control subfields aggregated in an A-control field (2905).

The first control subfield for the BSR may include at least one of first information indicating an access category of traffic buffered in the STA, second information indicating the size of the buffered traffic, third information indicating a unit of the second information, fourth information indicating the number of traffic identifiers (TIDs), fifth information indicating an access category of particular traffic of the buffered traffic, and sixth information indicating the size of the particular traffic. For example, the first information may be an Access Category Index (ACI) Bitmap subfield, the second information may be a Queue Size All subfield, the third information may be a Scaling Factor subfield, the fourth information may be a Delta TID subfield, the fifth information may be an ACI High subfield, and the sixth information may be a Queue Size High subfield.

If a second control subfield of the A-control field includes uplink power headroom information about the STA, the first control subfield for the BSR may be configured as a short BSR in which the fifth information and the sixth information are omitted.

When the first control subfield for the BSR is configured as the short BSR, the third information indicating the unit of the second information may be reduced from two bits to one bit. For example, when the first control subfield for the BSR is configured as the short BSR, only two of four units available when the third information is two bits, which are 16 bytes, 128 bytes, 2048 bytes, and 16384 bytes, may be available.

The second information set to a first value may indicate that the size of the buffered traffic exceeds a threshold value, and the second information set to a second value may indicate that the size of the buffered traffic is unknown. Here, the first value and the second value may change depending on whether the first control subfield for the BSR is configured as the short BSR.

Each of the one or two or more control subfields may include a control ID, a control ID of the first control subfield may be set to when the first control subfield for the BSR is not the short BSR, and the control ID of the first control subfield may be set to one of 5 to 15 when the first control subfield for the BSR is the short BSR.

The STA transmits a frame to an AP (2910). For example, the STA may transmit the A-control field through a high throughput (HT) control field included in an MAC header of a frame. The HT control field of the MAC header may correspond to an HE Variant A-control. For example, when the frame is a Quality of Service (QoS) null frame, the fifth information and the sixth information omitted from the short BSR may be transmitted through a QoS control field included in the MAC header.

The AP obtains the BSR of the STA via the first control subfield among the one or two or more control subfields aggregated in the A-control field received through the MAC header of the frame (2915). When the second control subfield of the A-control field includes uplink power headroom, the AP may further obtain th uplink power headroom from the second control subfield.

The WLAN system illustrated in FIG. 29 may correspond to IEEE 802.11ax supporting a high-efficiency physical layer protocol data unit (HE PPDU).

Although it is assumed that example 1 and example 2 are provided to transmit a BSR and UL power headroom via one frame, the present invention is not limited thereto. Instead, the foregoing examples may be employed to transmit a BSR and other control information (e.g., UL MU response scheduling, operating mode, and/or HE link adaptation) together.

Figure 30:
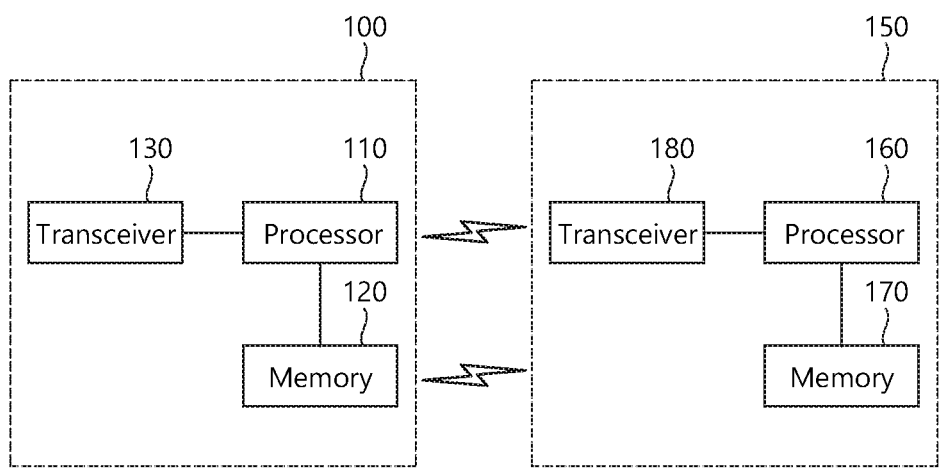
FIG. 30 illustrates a device according to an embodiment of the present invention.

FIG. 30 illustrates a device to implement the foregoing methods.

In FIG. 30, a wireless device 800 may correspond to a particular STA in the above description, and a wireless device 850 may correspond to an AP in the above description.

The STA 800 may include a processor 810, a memory 820, and a transceiver 830, and the AP 850 may include a processor 860, a memory 870, and a transceiver 880. The transceivers 830 and 880 transmit/receive a radio signal and may operate in a physical layer of IEEE 802.11/3GPP. The processors 810 and 860 may operate in the physical layer and/or an MAC layer and may be connected to the transceivers 830 and 880. The processors 810 and 860 may perform a UL MU scheduling procedure mentioned above.

The processors 810 and 860 and/or the transceivers 830 and 880 may include an application-specific integrated circuit (ASIC), other chipsets, a logic circuit, and/or a data processor. The memories 820 and 870 may include read-only memory (ROM), random access memory (RAM), flash memory, a memory card, a storage medium, and/or other storage units. When the embodiments are executed by software, the methods described herein may be executed as modules (e.g., processes and functions) that perform the functions described herein. The modules can be stored in the memories 820 and 870 and may be executed by the processors 810 and 860. The memories 820 and 870 may be disposed inside or outside the processors 810 and 860 and may be connected to the processors 810 and 860 via a known means.

As described above, the detailed description of the preferred exemplary embodiment of the present invention is provided so that anyone skilled in the art can implement and execute the present invention. In the detailed description presented herein, although the present invention is described with reference to the preferred exemplary embodiment of the present invention, it will be understood by anyone having ordinary skills in the art that diverse modifications, alterations, and variations can be made in the present invention. Therefore, the scope and spirit of the present invention will not be limited only to the exemplary embodiments of the present invention set forth herein. Thus, it is intended to provide the broadest scope and spirit of the appended claims of the present invention that are equivalent to the disclosed principles and novel characteristics of the present invention.

INDUSTRIAL APPLICABILITY

The present invention may be applied to various wireless communication systems including an IEEE 802.11 system.

What is claimed is:

1. A method in which a station (STA) transmits a frame comprising a buffer status report (BSR) in a wireless local area network (WLAN) system, the method comprising:
    configuring a BSR of the STA in a first control subfield among one or two or more control subfields aggregated in an aggregated (A)-control field; and
    transmitting the A-control field through a high throughput (HT) control field included in an MAC header of a frame,
    wherein the first control subfield for the BSR comprises at least one of first information indicating an access category of traffic buffered in the STA, second information indicating a size of the buffered traffic, third information indicating a unit of the second information, fourth information indicating a number of traffic identifiers (TIDs), fifth information indicating an access category of particular traffic of the buffered traffic, and sixth information indicating a size of the particular traffic, and
    wherein when a second control subfield of the A-control field comprises uplink power headroom information about the STA, the first control subfield for the BSR is configured as a short BSR in which the fifth information and the sixth information are omitted.

2. The method of claim 1, wherein when the frame is a Quality of Service (QoS) null frame, the fifth information and the sixth information omitted from the short BSR are transmitted through a QoS control field included in the MAC header.

3. The method of claim 1, wherein when the first control subfield for the BSR is configured as the short BSR, the third information indicating the unit of the second information is reduced from two bits to one bit.

4. The method of claim 3, wherein when the first control subfield for the BSR is configured as the short BSR, only two of four units available when the third information is two bits, which are 16 bytes, 128 bytes, 2048 bytes, and 16384 bytes, are available.

5. The method of claim 1, wherein the second information set to a first value indicates that the size of the buffered traffic exceeds a threshold value, wherein the second information set to a second value indicates that the size of the buffered traffic is unknown, and wherein the first value and the second value change depending on whether the first control subfield for the BSR is configured as the short BSR.

6. The method of claim 1, wherein each of the one or two or more control subfields comprises a control ID, wherein a control ID of the first control subfield is set to when the first control subfield for the BSR is not the short BSR, and wherein the control ID of the first control subfield is set to one of 5 to 15 when the first control subfield for the BSR is the short BSR.

7. The method of claim 1, wherein the WLAN system corresponds to IEEE 802.11ax supporting a high-efficiency physical layer protocol data unit (HE PPDU), wherein the HT control field of the MAC header corresponds to an HE Variant A-control, and wherein the first information is an Access Category Index (ACI) Bitmap subfield, the second information is a Queue Size All subfield, the third information is a Scaling Factor subfield, the fourth information is a Delta TID subfield, the fifth information is an ACI High subfield, and the sixth information is a Queue Size High subfield.

8. A station (STA) transmitting a frame comprising a buffer status report (BSR) in a wireless local area network (WLAN) system, the STA comprising:

a processor to configure a BSR of the STA in a first control subfield among one or two or more control subfields aggregated in an aggregated (A)-control field; and a transmitter to transmit the A-control field through a high throughput (HT) control field included in an MAC header of a frame under control of the processor, wherein the first control subfield for the BSR comprises at least one of first information indicating an access category of traffic buffered in the STA, second information indicating a size of the buffered traffic, third information indicating a unit of the second information, fourth information indicating a number of traffic identifiers (TIDs), fifth information indicating an access category of particular traffic of the buffered traffic, and sixth information indicating a size of the particular traffic, and wherein when a second control subfield of the A-control field comprises uplink power headroom information about the STA, the first control subfield for the BSR is configured as a short BSR in which the fifth information and the sixth information are omitted.

9. A method in which an access point (AP) receives a frame comprising a buffer status report (BSR) in a wireless local area network (WLAN) system, the method comprising:

receiving an A-control field through a high throughput (HT) control field included in an MAC header of a frame; and obtaining a BSR of a station (STA) via a first control subfield among one or two or more control subfields aggregated in an aggregated (A)-control field, wherein the first control subfield for the BSR comprises at least one of first information indicating an access category of traffic buffered in the STA, second information indicating a size of the buffered traffic, third information indicating a unit of the second information, fourth information indicating a number of traffic identifiers (TIDs), fifth information indicating an access category of particular traffic of the buffered traffic, and sixth information indicating a size of the particular traffic, and wherein when a second control subfield of the A-control field comprises uplink power headroom information about the STA, the first control subfield for the BSR is configured as a short BSR in which the fifth information and the sixth information are omitted.

10. The method of claim 9, wherein when the frame is a Quality of Service (QoS) null frame, the fifth information and the sixth information omitted from the short BSR are received through a QoS control field included in the MAC header.

11. The method of claim 9, wherein when the first control subfield for the BSR is configured as the short BSR, the third information indicating the unit of the second information is reduced from two bits to one bit.

12. The method of claim 11, wherein when the first control subfield for the BSR is configured as the short BSR, only two of four units available when the third information is two bits, which are 16 bytes, 128 bytes, 2048 bytes, and 16384 bytes, are available.

13. The method of claim 9, wherein the second information set to a first value indicates that the size of the buffered traffic exceeds a threshold value, wherein the second information set to a second value indicates that the size of the buffered traffic is unknown, and wherein the first value and the second value change depending on whether the first control subfield for the BSR is configured as the short BSR.

14. The method of claim 9, wherein each of the one or two or more control subfields comprises a control ID, wherein a control ID of the first control subfield is set to when the first control subfield for the BSR is not the short BSR, and wherein the control ID of the first control subfield is set to one of 5 to 15 when the first control subfield for the BSR is the short BSR.

15. The method of claim 9, wherein the WLAN system corresponds to IEEE 802.11ax supporting a high-efficiency physical layer protocol data unit (HE PPDU), wherein the HT control field of the MAC header corresponds to an HE Variant A-control, and wherein the first information is an Access Category Index (ACI) Bitmap subfield, the second information is a Queue Size All subfield, the third information is a Scaling Factor subfield, the fourth information is a Delta TID subfield, the fifth information is an ACI High subfield, and the sixth information is a Queue Size High subfield.

* * * * *